US010949825B1

(12) United States Patent
Brosamer et al.

(10) Patent No.: US 10,949,825 B1
(45) Date of Patent: Mar. 16, 2021

(54) ADAPTIVE MERCHANT CLASSIFICATION

(71) Applicant: Square, Inc., San Francisco, CA (US)

(72) Inventors: Jacquelyn Brosamer, Oakland, CA (US); Yongxue Qi, San Francisco, CA (US); Riley Crane, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/640,221

(22) Filed: Jun. 30, 2017

(51) Int. Cl.
*G06Q 20/20* (2012.01)
*G06F 16/28* (2019.01)

(52) U.S. Cl.
CPC ......... *G06Q 20/202* (2013.01); *G06F 16/285* (2019.01)

(58) Field of Classification Search
CPC ........ G06Q 20/04; G06Q 20/12; G06Q 20/20; G06Q 10/0639; G06Q 30/0201; G06Q 20/202; G06F 17/30598
USPC ................. 705/16, 53, 26, 35, 418, 44, 7.11
See application file for complete search history.

(56) References Cited

U.S. PATENT DOCUMENTS

| | | | |
|---|---|---|---|
| 6,564,213 B1 | 5/2003 | Ortega et al. | |
| 6,910,017 B1 | 6/2005 | Woo et al. | |
| 7,254,774 B2 | 8/2007 | Cucerzan et al. | |
| 7,447,678 B2 | 11/2008 | Taylor et al. | |
| 7,610,233 B1 | 10/2009 | Leong et al. | |
| 7,831,584 B2 | 11/2010 | Rothman | |
| 8,571,985 B1 | 10/2013 | Grigg et al. | |
| 9,741,030 B2 | 8/2017 | Tavares | |
| 9,836,743 B2 | 12/2017 | Celikyilmaz et al. | |
| 10,269,077 B2 | 4/2019 | Celikyilmaz et al. | |
| 10,304,056 B1 | 5/2019 | Izenson et al. | |
| 10,740,852 B1 | 8/2020 | George et al. | |
| 2002/0107746 A1 | 8/2002 | Jacoby, Jr. | |
| 2005/0004889 A1 | 1/2005 | Bailey et al. | |
| 2005/0102202 A1 | 5/2005 | Linden et al. | |
| 2005/0120006 A1 | 6/2005 | Nye | |
| 2006/0095370 A1 | 5/2006 | Seth et al. | |
| 2008/0040323 A1 | 2/2008 | Joshi | |
| 2008/0270275 A1 | 10/2008 | McElroy et al. | |
| 2009/0276522 A1 | 11/2009 | Seidel | |
| 2010/0023311 A1 | 1/2010 | Subrahmanian et al. | |
| 2010/0057786 A1 | 3/2010 | Hardy-McGee | |
| 2010/0106652 A1 | 4/2010 | Sandholm et al. | |
| 2011/0178849 A1* | 7/2011 | Rane ...................... | G06Q 30/02 705/7.31 |
| 2012/0290422 A1 | 11/2012 | Bhinder | |

(Continued)

OTHER PUBLICATIONS

T. K. Behera and S. Panigrahi, "Credit Card Fraud Detection: A Hybrid Approach Using Fuzzy Clustering & Neural Network," 2015 Second International Conference on Advances in Computing and Communication Engineering, Dehradun, 2015, pp. 494-499, doi: 10.1109/ICACCE.2015.33. (Year: 2015).*

(Continued)

*Primary Examiner* — Rajesh Khattar
*Assistant Examiner* — Carol A See
(74) *Attorney, Agent, or Firm* — Lee & Hayes, P.C.

(57) ABSTRACT

Techniques and arrangements for industry vertical classification of merchants using merchant signals, based, in part, on data obtained from payment activity. The techniques can include identifying one or more clusters using the data associated with the merchant and classifying and/or reclassifying the merchant within a cluster and then a class using the one or more identified clusters.

20 Claims, 12 Drawing Sheets

(56) References Cited

U.S. PATENT DOCUMENTS

| | | | |
|---|---|---|---|
| 2013/0073342 A1 | 3/2013 | Crump et al. | |
| 2013/0173320 A1* | 7/2013 | Bank | G06Q 20/00 |
| | | | 705/7.11 |
| 2013/0231976 A1* | 9/2013 | Tavares | G06Q 30/0201 |
| | | | 705/7.34 |
| 2014/0012704 A1 | 1/2014 | Mizhen et al. | |
| 2014/0114812 A1 | 4/2014 | Rothman | |
| 2015/0220958 A1 | 8/2015 | Tietzen et al. | |
| 2017/0344656 A1 | 11/2017 | Koren et al. | |

OTHER PUBLICATIONS

Non-Final Office Action dated Feb. 2, 2010, for U.S. Appl. No. 11/963,592, of Rothman, S., filed Dec. 21, 2007.
Notice of Allowance dated Sep. 16, 2010, for U.S. Appl. No. 11/963,592, of Rothman, S., filed Dec. 21, 2007.
Non-Final Office Action dated Jan. 6, 2016, for U.S. Appl. No. 14/184,447, of Kim, M., et al., filed Feb. 19, 2014.
Final Office Action dated Oct. 11, 2016, for U.S. Appl. No. 14/184,447, of Kim, M., et al., filed Feb. 19, 2014.
Non-Final Office Action dated Mar. 20, 2017, for U.S. Appl. No. 14/184,447, of Kim, M., et al., filed Feb. 19, 2014.
Final Office Action dated Aug. 31, 2017, for U.S. Appl. No. 14/184,447, of Kim, M., et al., filed Feb. 19, 2014.
Non-Final Office Action dated Dec. 15, 2017, for U.S. Appl. No. 14/747,064, of George, M.R., et al., filed Jun. 23, 2015.
Final Office Action dated Jul. 13, 2018, for U.S. Appl. No. 14/747,064, of George, M.R., et al., filed Jun. 23, 2015.
Advisory Action dated Oct. 16, 2018, for U.S. Appl. No. 14/747,064, of George, M.R., et al., filed Jun. 23, 2015.
Final Office Action dated Dec. 12, 2019, for U.S. Appl. No. 14/747,064, of George, M.R., et al., filed Jun. 23, 2015.
Non-Final Office Action dated Feb. 13, 2020, for U.S. Appl. No. 15/787,519, of Brennan, K., et al., filed Oct. 18, 2017.
Notice of Allowance dated Apr. 3, 2020, for U.S. Appl. No. 14/747,064, of George, M.R., et al., filed Jun. 23, 2015.
Final Office Action dated Aug. 10, 2020, for U.S. Appl. No. 15/787,519, of Brennan, K., et al., filed Oct. 18, 2017.
Advisory Action dated Oct. 22, 2020, for U.S. Appl. No. 15/787,519, of Brennan, K., et al., filed Oct. 18, 2017.
Non-Final Office Action dated May 28, 2019, for U.S. Appl. No. 14/747,064, of George, M.R., et al., filed Jun. 23, 2015.

\* cited by examiner

CLASSIFICATION INTERFACE 128

Current Business Class: 5399
(Miscellaneous General Merchandise)

Based on your payment activity, we recommend that you switch your business classification to one of the following:

Business Class: 5411
(Grocery Stores, Supermarkets)

Business Class: 5462
(Bakeries)

Business Class: 5499
(Miscellaneous Food Stores)

Business Class: 5814
(Fast Food Restaurants)

If you would like to update your business class, please select one of the listed business classes.

Thank you.

Fig. 3

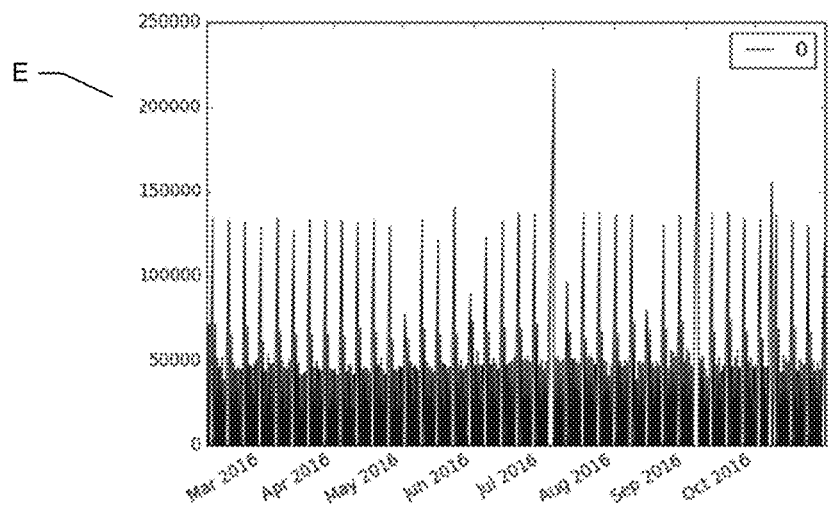
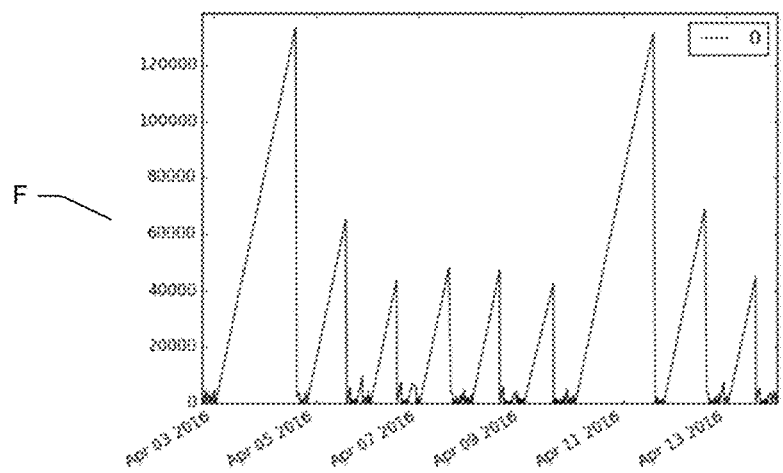
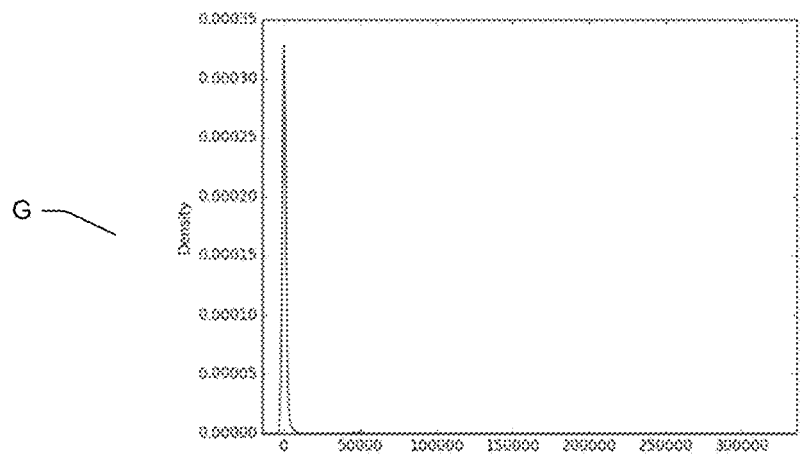
Fig. 8

ADAPTIVE MERCHANT CLASSIFICATION

TECHNICAL FIELD

Credit card companies classify merchants operating retail stores using a business code based on the types of goods and services that a merchant provides. For instance, a merchant category code (MCC) is a four-digit number assigned to a merchant by credit card companies when the merchant starts accepting cards offered by the credit card companies as a form of payment from customers of the merchant. The MCC affects the fees that the merchant pays to the credit card companies, and determines if the merchant needs to report payments to the Internal Revenue Service (IRS) for tax purposes. Therefore, it is beneficial for a merchant to be classified using the correct MCC so that the merchant is not paying more fees than the credit card companies require and/or so that the merchant reports necessary payment information to the IRS.

Besides benefits to the merchant, there are also benefits to the credit card companies and/or customers of the merchant. For instance, credit card companies can better understand aspects of various merchant businesses, such as popularity among different business segments. Additionally, a customer's credit card statement will reflect transactions more accurately, thus reducing potential chargebacks and support inquiries.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example user interface that a POS device of a merchant may display, where the user interface includes a recommendation for four classes for merchant selection.

FIG. 8 illustrates graphical plots indicating data useful for rich segmentation of merchants.

DETAILED DESCRIPTION

Figure 1:
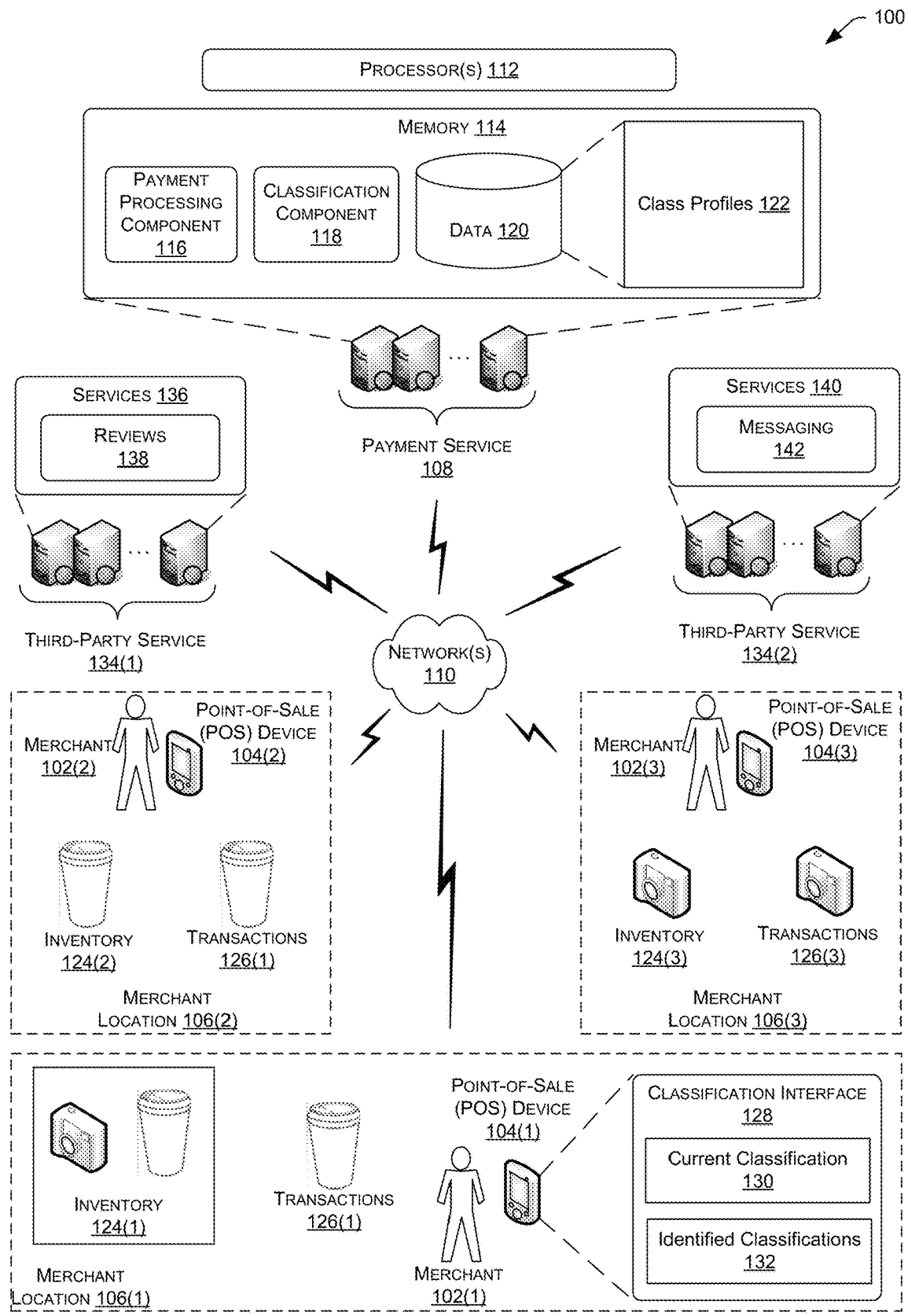
FIG. 1 illustrates an example environment that includes a merchant receiving, from a payment processing system, an updated classification. In this example, the payment processing system is receiving data from the merchant, comparing the data to machine generated class profiles, and determining the updated classification for the merchant based at least in part on the comparing.

Some examples described herein include techniques and arrangements, implemented by a computing device, for determining a behavior of a merchant (also referred to as seller) in terms of merchant's fundamental properties, and thus fingerprinting the merchant, based on that merchant's payment activity. For example, the systems and methods disclosed herein analyze information embedded in the payment events (also referred to as situational features), such as operating hours, busy times, physical locations, item type, price range, the route that a merchant takes for their business operations, the payment activity while on the route, and the temporal, geospatial, sequential, and spectral properties of payment activity, to name a few. Such analysis and subsequent representation of analyzed information allows rich segmentation of merchants into classes, including but not limited to MCC type classes.

Accordingly, queries such as "how does loyalty affect customer retention when there are similar sellers nearby?," "which geographic areas are experiencing the most growth or decline?", "where are nearby events (farmers markets, food truck fairs, etc.)?," can be answered. Broadly speaking, such analysis can be applied to additional problem areas, for example, MCC labeling, risk modeling, metrics benchmarking and establishment, churn detection, optimization, seasonality detection, account takeover, new buyer or seller targeting, loyalty rewards, market analysis and segmentation, viral adoption, and the like.

In one implementation, the techniques described herein classify merchants into machine classifications by comparing information associated with the merchant using various machine-learning models which may not completely rely on any rules-based programming instructions or algorithms.

In other implementations, the merchants are classified into a number of classifications by analyzing the information associated with the information with other data, such as historical trends, other merchant data, and so on, using statistical models such as predictive and heuristic models. The model from data variables is formed in the form of mathematical equations and algorithms.

Thus, in the techniques described herein, reclassification of a merchant can include classifying a merchant in a number of clusters and/or reclassifying a merchant to a new class based on situational features defined by payment signals and data from itemization, location, common buyers, dynamic fingerprinting, and other such features, to create a seller intelligence platform.

A class is generally and traditionally based on a merchant category code (MCC) assigned to the merchant by one or more entities, or based on revenue generated by the merchant. For example, credit card companies, a payment processing system, and/or another entity may classify a merchant using one of various MCCs. A merchant can be assigned within a MCC based on a type of items and/or services that the merchant provides. However, MCC or revenue based classification is a one-dimensional and sometimes flawed way of merchant classification. MCC is a flawed framework for a few reasons. First, because MCC is self-reported during onboarding of the sellers, sellers are often mislabeled, possibly due to sellers' confusion.

In addition to unreliability due to self-reporting, traditional MCC is not rich enough to fully capture the contextual information about a seller, especially the seller's unique requirements (also referred to as Jobs) from the payment framework expressed, for example, through a 'Jobs To Be Done' (JTBD) framework. In the JTBD framework, the model factors not just the goods or service that is sold, but the situational features that define the Jobs a seller has. For example, a caterer and a T-shirt printer would be classified as 'food and drink' and 'retail' under MCC, but may look very similar in terms of payment products used (invoices, mobile reader) and payment activity (infrequent CNP transactions with high dollar amount in a variety of locations). One of the largest MCCs is 'food and drink,' which really includes sellers with very different JTBD, for example quick-serve and full-serve restaurants. From both a JTBD (and credit risk) perspective, MCCs group some dissimilar sellers and fail to connect other similar sellers.

To this end, the embodiments described herein first, obtain situational features from the merchant's payment activity, for example based on spatio-temporal data points and/or itemization data, and second, analyze the situational features to enable richer merchant insights, classification or reclassification of a merchant in itemization topics, predicted MCCs, and JTBD clusters, where the JTBD clusters can have flexible boundaries, retention analysis, risk analysis, cross-sell, and the like. The classification or reclassification can be based on models that execute automation using one or a combination of heuristic statistical models, machine-learning models such as supervised and unsupervised models, and deep learning models.

Machine learning models are used to create cluster sellers, for example by JTBD, in a more intelligent way than the MCC and revenue based segmentation. For example, in one implementation, the methods and systems implement a Latent Dirichlet Allocation (LDA) model to itemization data to create itemization topics and itemization names. Reclassification of sellers is then accomplished by executing a Random Forest Classification model that predicts a seller category based on real-time data and historical data. After engineering an intuitive set of contextual features that define a seller's JTBD, the system implements an unsupervised clustering algorithm that takes these features as input and outputs the seller's most probable cluster. These clusters can be correlated to MCC, since most clusters have only one or two MCCs overrepresented, but can also illuminate similarities across MCCs and differences within MCCs. For example, a cluster with high card not present transactions, mobile payments, payment a few times a day, and sole professionals might have mostly home and repair and professional services MCC. Another cluster might consist of only Quick Service Restaurants (QSRs), well defined by the payment activity, while some full service restaurants (FSRs) might be clustered with retail sellers.

In another implementation, the systems and methods apply statistical models to form relationships between variables in the data in the form of mathematical equations. For example, the historical data is analyzed to extract temporal features, location based features, sequential features, and spectral features emitted by the business in the course of their operations.

Deep learning models have been used for encoding contextual similarity between a variety of objects like words, images, drawings, and even 3D shapes. These models encode the complexity as a high-dimensional vector such as word2vec. Those vectors are extremely useful in that they define an immediately useful concept of similarity between objects. Things like 'coffee'~'cafe' or 'image of bicycle'~'image of unicycle.' In some implementations, deep learning models can be used to learn a vector representation of each merchant.

These vector representations are usually learned in a particular context, such as in the course of predicting a certain classification problem. The deep learning models can be used to influence the context by choosing what classes are learned to select, for example by using a soft max versus metric learning approach. The deep learning models can also be used to predict merchant type and take the learned vectors for more general use. Those vectors should encode similarity in terms of roughly what kind of business the seller does and learn these encodings in an unsupervised way. Such deep learning models, as described before, can be used to define "neighbors," and within what distance from the point do these neighbors lie. Furthermore, the models are used to cluster by discovering structure and pattern around the sellers. The models can be further improved by adding representation as features, adding clusters as categorical features and using clusters to impute data.

To identify the MCCs and JTBD clusters for a specific merchant, a payment processing system (and/or other service) can collect merchant signals for the merchant. Merchant signals for a merchant may include reported data, collected data, training data, and third-party data associated with the merchant. For example, the payment processing system can receive reported data from a point-of-sale (POS) device of a merchant and/or an online merchant interface to the payment processing system that is accessible by the merchant. The reported data can indicate a selected class for the merchant, a business name of the merchant, a set of items offered by the merchant (e.g., inventory items), and/or a geographical location of the merchant.

The payment processing system can further receive collected data from the POS device of the merchant. The collected data can indicate transactional information for the merchant, such as classes of items acquired by customers from the merchant and payment activity for the merchant. Payment activity for the merchant may include tips the merchant receives, ticket sizes for the merchant, volumes of item and/or service provided (e.g., sold, rented, leased, etc.) by the merchant, a time of day for providing items and/or services, or other sorts of data corresponding to transactions for the merchant.

The payment processing system can generate training data comprising (a) the stored historical transaction data; (b) an indication, for each historical purchase transaction, of whether the purchase transaction was ultimately determined to be fraudulent; and (c) a classification of a merchant associated with the transaction and/or business. For example, all transactions related to coffee may be the subject of a specific classification. In addition, for historical purchase transactions that were manually reviewed by human analysts, the training data may indicate whether the classification was changed from classification A to classification B.

Additionally, the payment processing system can receive third-party data associated with the merchant from one or more third-party services. For instance, the payment processing system can receive an email address for the merchant from an email service or provider (and/or POS device of the merchant), merchant reviews for the merchant from a review service or provider (e.g., blogging service), and/or other sorts of third-party data associated with the merchant. The payment processing system can then generate a business profile for the merchant that includes the reported data, the collected data, and the third-party data, and use the data included in the business profile to classify the merchant in a class and/or reclassify the merchant to a new class.

For instance, the payment processing system can compare data in the business profile of the merchant to a collection of class profiles. Each class profile may be associated with a classification (e.g., MCC) and include data about the class and/or data about merchants that are assigned to the class. For example, the data may include one or more words that merchants assigned to the class commonly use in their business names (e.g., "pub" for merchants that are classified as bars). The data may further include a cluster of items associated with the class (e.g., items offered by the merchants assigned to the class, items acquired by customers from the merchants assigned to the class, etc.), payment activity for merchants assigned to the class (e.g., tips the merchant receives, ticket sizes for the merchant, volumes of items sold by the merchant, time of day for sales of items and/or services), and/or geographical locations of the merchants assigned to the class. The payment processing system can determine the data based on information that is common to the class and/or the payment processing system can receive the data from merchants that are assigned to the class.

In one implementation, in capturing the contextual features of a merchant, the methods and systems train an LDA topic model using sellers' itemization text to cluster sellers who provide similar goods and services.

In another implementation, in comparing data from the business profile of the merchant to the class profiles, the payment processing system can identify one or more class profiles that are similar to the business profile of the merchant. For example, the payment processing system can identify class profiles that include business names that are similar to the business name of the merchant. Similar business names can include one or more words that are common between the business names. For instance, the business name of the merchant may include the word "pub." The payment processing system can then identify class profiles that include merchants that also use the word "pub" in the merchants' business names. The payment processing system can then determine that the business profile of the merchant is similar to those identified class profiles.

For another example, the payment processing system can identify one or more class profiles based on the one or more class profiles including transactional information that is similar to the transactional information of the merchant. For instance, the payment processing system can identify class profiles that include the same and/or similar cluster of items as the cluster of items offered by the merchant, the same and/or similar cluster of items as the cluster of items acquired by customers from the merchant, and/or payment activity that is within a threshold value as the payment activity of the merchant. As discussed above, the payment activity for a merchant may include a percentage of tips that the merchant receives, ticket sizes for the merchant, and/or volumes of items customers acquire from the merchant.

For example, the payment processing system can identify class profiles that are similar to the business profile of the merchant based on the class profiles including a revenue that is within a threshold revenue (e.g., within a set percentage or range) as revenue of the merchant. For another example, the payment processing system can identify class profiles that include a number of tips (e.g., total tip amount and/or percentage of revenue that includes tips) that is within a threshold tip (e.g., within a set percentage or range) as a number of tips of the merchant. Additionally, the payment processing system can further perform similar methods to identify class profiles that include similar ticket sizes as the merchant and/or similar volume sizes of acquired items as the merchant.

When using a threshold to determine similarities between class profiles and the business profile of the merchant (and/or data included in the business profile of the merchant), the payment processing system and/or another entity can set a threshold value. For example, the payment processing system and/or other entity can set the threshold to include a specified percentage, such as 50%, 75%, 90%, 100%, or the like. For another example, the payment processing system and/or other entity can set the threshold to include a specified value range. For instance, when using revenue, the payment processing system can set ranges that include $100,000-$200,000 a month, $750,000-$1,000,000 a year, or the like.

The payment processing system can further use the third-party data to identify the one or more class profiles that are similar to the business profile of the merchant. For example, the payment processing system can determine classes of items acquired by customers from the merchant based on customer reviews that are associated with the merchant. The payment processing system can then use that determination to identify class profiles that include the cluster of items. For another example, the payment processing system can use the email address of the merchant to identify one or more class profiles that are similar to the business profile of the merchant. For instance, if the email address for the merchant ended with @myrestaurant.com, the payment processing system can determine that the merchant is a restaurant and use that determination to identity class profiles that are associated with restaurants.

After identifying the one or more class profiles that are similar to the business profile of the merchant, the payment processing system can either classify the merchant using a class corresponding to one of the class profiles, or reclassify the merchant to a new class. When classifying and/or reclassifying a merchant with a class, the payment processing system can base the determination using one or more rules.

For instance, the payment processing system can use rules that select the class from the one or more identified classes based on fees charged to the merchant. For example, credit card companies and/or other entities may require the merchant to pay different rates (e.g., fees) based on which class (e.g., MCC) is assigned to the merchant. As such, the payment processing system can determine fees that will be charged to the merchant for each of the identified classes and rank the classes based on the fees. The payment processing system can then use a rule that selects the class that charges, for instance, the least amount of fees to the merchant.

Besides rules based on fees to the merchant, the payment processing system can implement a rule that prioritizes selection of certain classes over other classes. For example, if the payment processing system determines that a particular merchant may fairly be associated with a first class "restaurants" and a second class "bars", the payment processing system may select the more inclusive class, which in this case comprises the first class "restaurants".

Additionally, the payment processing system can allow the merchant to select a class from the one or more identified classes. For instance, the payment processing system can send a message indicating the identified classes to the POS device of the merchant. The POS device can then provide the merchant with an interface that includes the identified classes for selection. In response to a merchant selection of a class using the interface, the POS device can then send a message indicating the selection to the payment processing system so that the payment processing system can classify and/or reclassify the merchant using the selected class.

In reclassifying a merchant, the payment processing system can perform the techniques described above at given time intervals. For instance, the payment processing system may continue collecting data associated with the merchant and update the business profile of the merchant using the data. The payment processing system can then use the data included the updated business profile of the merchant to determine whether the merchant is classified in the correct class at each given time interval. For example, the payment processing system can make the determination each week, month, year, or some other give time period.

Although the techniques described describe reclassifying the class of the merchant, the payment processing system can alternatively determine not to reclassify the merchant based on the identified class profiles. For instance, the payment processing system can determine that the current class of the merchant accurately represents the merchant. As a result, the payment processing system can determine not to reclassify the merchant into a new class.

Additionally, while the above provides classifying and/or reclassifying a single merchant to a class, the described techniques can classify and/or reclassify any number of merchants using the examples described above. For instance, the payment processing system may generate profiles for more than one merchant and compare each of the profiles to the class profiles associated with the various classes. The payment processing system can then identify one or more merchants that are classified in the wrong class and/or classified in a class that is not beneficial to the merchant. In response, the payment processing system can flag these merchants and either reclassify the merchants to a new class, or provide the merchants with alternative classes for the merchants' selections.

Furthermore, while the techniques described above are illustrated as being performed by the payment processing system, in other instances, the POS device of the merchant can collect the data associated with the merchant, generate a business profile for the merchant using the data, compare the data included in the business profile of the merchant to the class profiles, and classify and/or reclassify the merchant based on the comparison. The POS device can then send a message indicating the class to the payment processing system and/or another service (e.g., one or more credit card companies).

Even though the description herein uses classification and reclassification of merchants as an application, it will be understood that the systems and methods described herein can be implemented for other applications, such as risk modeling, establishment of metrics, churn detection, business operations optimization, detection of seasonalities, account takeover, existing buyer targeting, new buyer targeting, loan or capital advancing, loyalty magnetism, retention analysis, merchant targeting with products, market analysis and segmentation, and viral adoption. To this end, instead of merchant classification, the machine learning model may look for some other kind of commonality and cluster the merchants or customers accordingly. Furthermore, even though the present subject matter uses payments as an example, the idea can be implemented in other fields such as advertising, marketing, banking and investments, just to name a few.

Furthermore, once the merchants are classified or understood in a contextual way, the use cases of the segmentation application include, but are not limited to: cross-selling to give a more granular way to sell the right products with highlights on particular features; differentiating between QSR and FSR within restaurants; applying reclassified MCCs for invoice financing, evaluate credit risk, e.g., cluster pre-sale merchants together, suggesting specific close of days by day of the week of merchants want their day's transactions batched into a single deposit, and other business vertical specific POS use cases.

Some implementations described herein implement machine learning models, while others implement heuristic models, and yet others implement a combination of the two. For example, in one implementation, both the models can be implemented and the results from the models compared and weighted to pick one or a combination of the results.

While some implementations described herein use payment activity as a basis for MCC classification, it would be understood that other factors may be used either in combination with payment activity or alone. For example, in one implementation third party data, such as data obtained by crawling a merchant's website can be used for merchant classification, especially when payment activity is under a threshold.

The methods and systems disclosed herein describe an automated and more accurate classification within the merchant database thereby reducing the computing steps necessary for a merchant to classify their own business (e.g., multiple classification attempts) and the likelihood of an incorrect classification that may result in higher processing fee or violation of other legal requirements. For example, certain MCCs need to meet HIPAA requirements, etc., and the system described herein detects the appropriate MCC based on payment behavior and not merchant's discretion. Also, since the credit card companies tie their rewards to MCCs, an incorrect classification may cause incorrect allocation of credit card points and rewards, but implementing the disclosed system and method helps alleviate such problems. Furthermore, present subject matter greatly reduces memory consumption through auto-reclassification in the event merchant was classified in multiple categories in the database. In another scenario, the present subject matter classifies in a category that changes dynamically as the merchant interacts with the payment service and customers. In yet another scenario, the same merchant can be in multiple clusters to allow the system to process the merchant's activity in multiple ways and through multiple perspectives. For example, in parallel, or substantially contemporaneously, the merchant may be presented with a product suggestion and a loan advance in response to the same transaction, because the merchant is classified in two seemingly different clusters.

Figure 9:
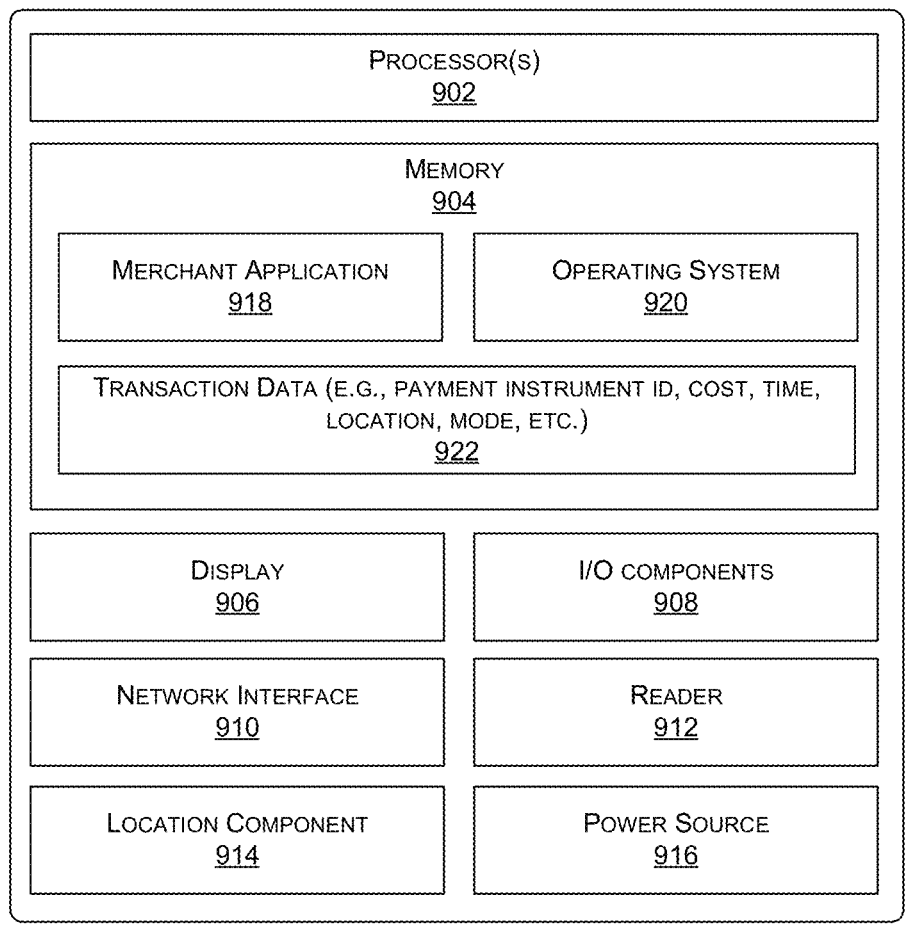
FIG. 9 illustrates select components of a POS device that a merchant described herein may utilize.

FIG. 1 illustrates an example environment 100 that includes a merchant 102(1) operating a point-of-sale (POS) device 104(1) to engage in various transactions with respective customers. Similarly, merchants 102(2)-(3) may operate POS devices 104(2)-(3) respectively to engage in various transactions with respective customers. The POS device 104(1) may comprise any sort of mobile or non-mobile device that includes an instance of a merchant application that executes on the respective device (as illustrated in FIG. 9). The merchant application may provide POS functionality to the POS device 104(1) to enable the merchant 102(1) (e.g., an owner, employees, etc.) to accept payments from the customers. In some types of businesses, the POS device 104(1) may correspond to a store or other place of business of the merchant, and thus, may be a fixed location that typically does not change on a day-to-day basis. In other types of businesses, however, the POS device 104(1) may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of items (goods and/or services) that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104(1) to process the transaction, such as by inputting (e.g., manually, via a magnetic card reader or an RFID reader, etc.) an identifier associated with the payment instrument. For example, a payment instrument of the customer 106 may include one or more magnetic strips for providing card and customer information when swiped in a card reader. In other examples, other types of payment cards may be used, such as smart cards having a built-in memory chip that is read by the POS device 104(1) when the card is "dipped" into the reader, a radiofrequency identification tag, or so forth.

During the transaction, the POS device 104(1) can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104(1) can send the transaction information to a payment processing system 108 over a network 110, either substantially contemporaneously with the conducting of the transaction (in the case of online transactions) or later when the device 104(1) is in the online mode (in the case offline transactions).

In an offline transaction, the POS device 104(1) may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers, the POS device 104(1) may provide the stored information to the payment processing system 108 over the network 110. The network 110 may represent any one or more wired or wireless networks, such as a WiFi network, a cellular network, or the like. In an online transaction, the POS device 104(1) may send this information to the payment processing system 108 over the network 110 substantially contemporaneously with the transaction with the customer.

As illustrated, the payment processing system 108 may include one or more processors 112 and memory 114, which may store a payment-processing component 116, a classification component 118, and data 120 storing different class profiles 122 associated with various classes.

The payment processing component 116 may function to receive the information regarding a transaction from the POS device 104(1) and attempt to authorize the payment instrument used to conduct the transaction, as described above. The payment processing component 116 may then send an indication of whether the payment instrument has been approved or declined back to the POS device 104(1).

When a customer and a merchant enter into an electronic payment transaction, the transaction is processed by electronically transferring funds from a financial account associated with the customer to a financial account associated with the merchant. As such, the payment processing component 116 may communicate with one or more computing devices of a card network (or "card payment network"), e.g., MasterCard®, VISA®, over the network 110 to conduct financial transactions electronically. The payment processing component 116 can also communicate with one or more computing devices of one or more banks over the network 110. For example, the payment processing component 116 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In some instances, the payment processing system 108 can classify and/or reclassify a class for the merchant 102(1) based on one or more class profiles 122. A class can include a merchant category code (MCC) assigned to the merchant 102(1) by one or more entities. For example, credit card companies, a payment processing system, and/or another entity may classify the merchant 102(1) using one of various MCCs. The merchant 102(1) can be assigned within a MCC based on a type of items and/or services that the merchant provides.

FIG. 1, for instance, illustrates an example where the payment processing system 108 generates class profiles 122 for various classes. The payment processing system 108 can generate each of the clusters or class profiles 122 using data that represents information that is common to the respective class and/or data that the payment processing system 108 receives from merchants that are assigned to the respective class. The information that is common the respective class can include a cluster of items associated with the class and/or a cluster of services associated with the class. The data that the payment processing system 108 receives from merchants can include business names of the merchants assigned to the business, classes of items offered by the merchants assigned to the class, classes of items acquired by customers from the merchants assigned to the class, transactional information for merchants assigned to the class, geographical locations of merchants assigned to the class, or other sorts of data that the payment processing system 108 can receive from merchants.

For instance, the payment processing system 108 can receive data from the POS devices 104(2)-(3) of merchants 102(2)-(3). The data may include classes assigned to the merchants 102(2)-(3), business names for the merchants 102(2)-(3), classes of items offered (e.g., inventories 124(2)-(3)) by the merchants 102(2)-(3), classes of items acquired (e.g., transactions 126(1)-(2)) by customers from the merchant 102(2)-(3), transactional information for the merchant 102(2)-(3), and/or geographical locations (e.g., merchant locations 106(2)-(3)) of the merchants 102(2)-(3). The transactional information for the merchants 102(2)-(3) can include payment activity for the merchants 102(2)-(3), such as a revenue for the merchants 102(2)-(3), tips the merchants 102(2)-(3) receive, ticket sizes for the merchants 102(2)-(3), volumes of items or service the merchants 102(2)-(3) provide (e.g., sold, rented, borrowed, etc.), and times during the day that the items or services were provided.

To generate each of the class profiles 122, the payment processing system 108 uses the data that represents commonly known information about the classes and/or the data that the payment processing system 108 receives from the merchants 102(2)-(3). For instance, the payment processing system 108 can generate a class profile 122 for grocery stores and supermarkets (e.g., class 5411) using data that represents commonly known information about grocery stores and supermarkets. The payment processing system can further use data that the payment processing system receives from merchant 102(2), which can include a grocery store in the example of FIG. 1.

For example, a class profile 122 corresponding to grocery stores and supermarkets can include data indicating common words that merchants within the class use for business names (e.g., "grocery"), one or more classes of items associated with (e.g., offered by and/or provided by merchants) the class (e.g., food), and transactional information common to the class. The payment processing system 108 can determine the classes of items associated with the class based on information that is common to the class. For instance, grocery stores and supermarkets sell groceries (e.g., food). The payment processing system 108 can further determine the common words that merchants within the class use for business names, classes of items offered by merchants assigned to the class, classes of items acquired by customers from merchants assigned to the class, and the transactional information common to the class from data that the payment processing system 108 receives from merchants, such as merchant 102(2) in FIG. 1.

As illustrated in FIG. 1, the payment processing system 108 further receives data from the POS device 104(1) of the merchant 102(1). The data received from the POS device 104(1) of the merchant 102(1) can include reported data and collected data. Reported data can include a selected class for the merchant 102(1), a business name for the merchant 102(1), a cluster of items offered (e.g., inventory 124(1)) by the merchant 102(1), a geographical location (e.g., merchant location 106(1)) for the merchant 102(1), and/or other sorts of reported data that the payment processing system 108 can receive from the merchant 102(1) and use to classify the merchant 102(1). Collected data can include a cluster of items that customers acquire (e.g., transactions 126(1)) from the merchant 102(1), transactional information for the merchant 102(1), and/or other sorts of collected data that the payment processing system 108 can receive from the merchant 102(1) and use to classify the merchant 102(1). Meanwhile, the classification component 118 also accesses training data stored in data 120.

Training data, in one implementation, includes itemization data. The itemization data is data related to the items being sold by the merchant or similar merchants. In another implementation, the training data includes data related to payment events. Accordingly, the training data includes geospatial, temporal, sequential and spectra data emitted by a business in the course of their operations. To this end, the classification component 118 may include sensors, for example, hardware or software sensors, to track the payment events, demographics, interests, and behaviors of the merchants.

While receiving the data from the merchant 102(1), the payment processing system 108 may generate a business profile for the merchant 102(1). The business profile can include the reported data and/or the collected data associated with the merchant. The payment processing system 108 then uses the business profile of the merchant 102(1) and/or specific data within the business profile of the merchant 102(1) to identify one or more class profiles 122 for the merchant 102(1). Using the identified class profiles 122, the payment processing system 108 then classifies the merchant 102(1) within a class and/or reclassifies the merchant 102(1) within a new class.

In one implementation, the payment processing system 108 can also create clusters based on machine learning models, such as LDA model, deep learning models, random forest classification models, to generate profiles for each merchant. In some cases, such profiles or clusters may be several and thus, arranged in order of complexity of payment activity or probability of the cluster being relevant to the merchant. To this end, the classification component 118 may include determine a score associated with a merchant's payment activity vis-à-vis other merchants in various clusters. The score may be representative of the complexity of the payment activity (i.e., a complexity score) or the relevant of the payment activity to other merchants in one or more clusters (probability score). In at least one example, the classification component 118 may determine a complexity score and/or probability score based on a set of rules. For instance, a set of rules may indicate how to score various content items or payment activity. In other examples, the classification component 118 may determine a complexity score and probability score based on a previously trained data model, as described above. In such examples, the data model may leverage content associated with a merchant and may output a complexity score based on the content.

As described above, a complexity score above a threshold complexity score, or within a particular range of complexity scores, may indicate that a merchant is active (i.e., several payments) merchant. Alternatively, a complexity score below a threshold complexity score, or outside of the particular range of complexity scores, may indicate that a merchant is inactive (i.e., low payment activity). In at least one example, different ranges of complexity scores may correspond to different levels of complexity. Accordingly, the cluster assigned to them may vary based on the complexity and/or probability score.

For instance, the payment processing system 108 can compare data included in the business profile of the merchant 102(2) to the class profiles 122 to identify one or more class profiles 122 that are similar to the business profile of the merchant 102(1). For example, the payment processing system 108 can identify class profiles 122 that include business names that are similar to the business name of the merchant 102(2). Similar business names can include one or more words that are common between the business name of the merchant 102(1) and business names associated with class profiles 122. For instance, the business name of the merchant 102(1) may include the word "grocery." The payment processing system 108 can then identify class profiles 122 that include merchants that also use the word "grocery" in the merchants' business names. The payment processing system 108 can then determine that the business profile of the merchant 102(1) is similar to the identified class profiles 122.

For another example, the payment processing system 108 can identify one or more class profiles 122 based on the one or more class profiles 122 including transactional information that is similar to the transactional information of the merchant 102(1). For instance, the payment processing system 108 can identify class profiles 122 that include the same and/or similar cluster of items as the cluster of items in the inventory 124(1) of the merchant 102(1), the same and/or similar cluster of items as the cluster of items acquired (e.g., transactions 126(1)) by customers from the merchant 102(1), and/or payment activity that is within a threshold value as the payment activity of the merchant 102(1). As discussed above, payment activity for the merchant 102(1) can include the revenue of the merchant 102(1), percentage of tips that the merchant 102(1) receives, ticket sizes for the merchant 102(1), and/or volumes of items customers acquire from the merchant 102(1).

For example, the payment processing system 108 can identify class profiles 122 that are similar to the business profile of the merchant 102(1) based on the class profiles 122 including a revenue that is within a threshold revenue (e.g., within a set percentage or range) as revenue of the merchant 102(1). For another example, the payment processing system 108 can identify class profiles 122 that include a number of tips (e.g., total tip amount and/or percentage of revenue that includes tips) that is within a threshold tip (e.g., within a set percentage or range) as an amount of tips of the merchant 102(1). The payment processing system 108 can further perform related methods to identify class profiles 122 that include similar ticket sizes as the merchant 102(1) and/or similar volumes of acquired items as the merchant 102(1).

When using a threshold to determine similarities between class profiles 122 and the business profile of the merchant 102(1) (and/or specific data included in the business profile of the merchant 102(1)), the payment processing system 108 and/or another entity can set the threshold. For example, the payment processing system 108 and/or other entity can set the threshold to include a specific percentage, such as 50%, 75%, 90%, 100%, or the like. For another example, the payment processing system 108 and/or other entity can set the threshold to include a specific value range. For instance, when using revenue, the payment processing system 108 can set ranges that include $100,000-$200,000 a month, $750,000-$1,000,000 a year, or the like.

Besides using reported data and collected data from the merchant 102(1), the payment processing system 108 can further use third-party data to identify class profiles 122 for the merchant 102(1). For instance, as FIG. 1 illustrates, the payment processing system 108 can receive third-party data from each of third-party service 134(1) and third-party service 134(2). Third-Party service 134(1) can provide services 136 that includes reviews 138 of merchants 102(1)-(3). For example, third-party service 134(1) can host a blog or website that allows customers to post reviews 138 about merchants 102(1)-(3). The reviews 138 can include a listing of products and/or services the customers acquired from merchants 102(1)-(3), the forms payments the merchants 102(1)-(3) accept from the customers, the quality of service the customers received from the merchants 102(1)-(3), or the like. The payment processing system 108 can then use these reviews 138 to identifying class profiles 122 for the merchant 102(1).

For instance, the payment processing system 108 can use the reviews 138 of the merchant 102(1) to determine which products the merchant 102(1) is actually providing (e.g., selling, renting, borrowing, etc.) to customers. For example, in FIG. 1, the merchant 102(1) may report to the payment processing system 108 that the merchant 102(1) offers items (e.g., electronics and food) in inventory 124(1) to customers, which may cause the merchant 102(1) to be placed within a first class (e.g., miscellaneous general merchandise). However, based on the reviews 138, the payment processing system 108 can determine that the vast majority of sales of items actually includes transactions 126(1) (e.g., the food). Since the vast majority of sales is actually in food, the payment processing system 108 can determine that the merchant 102(1) can actually be placed within a second class (e.g., grocery stores, supermarkets). Therefore, based on the reviews 138, the payment processing system 108 can reclassify the merchant 102(1) within the second class.

In FIG. 1, the payment processing system 108 can also receive third-party data from third-party service 134(2). Third-Party service 134(2) can provide services 140 that include messaging 142 services for merchant 102(1)-(3). For example, third-party service 134(2) can host an email service for merchants 102(1)-(3). The payment processing system 108 can thus use email addresses received from third-party service 134(4) to identify class profiles 122 for the merchant 102(1). For example, if the email address for the merchant 102(1) ended with @mygroceries.com, the payment processing system 108 can determine that the merchant 102(1) is a restaurant and use that determination to identity class profiles 122 that are associated with restaurants.

After identifying the one or more class profiles 122 that are similar to the business profile of the merchant 102(1), the payment processing system 108 can either classify the merchant 102(1) using a class that corresponds to one of the identified class profiles 122, or reclassify the merchant 102(1) within a new class that corresponds to one of the identified class profiles 122. When classifying and/or reclassifying the merchant 102(1) with a class, the payment processing system 108 can implement one or more classification rules.

For instance, the payment processing system 108 can implement a rule that selects the class from the one or more identified classes that includes the lowest rate of fees for the merchant 102(1). For example, credit card companies and/or other entities may require the merchant 102(1) to pay different rates (e.g., fees) based on which MCC is assigned to the merchant 102(1). As such, the payment processing system 108 can select the MCC that requires the merchant 102(1) to pay the least amount of money in fees.

Additionally, the payment processing system 108 can implement a rule that prioritizes selection of certain classes over other classes. For example, if the payment processing system 108 identifies a first class for the merchant 102(1) that is associated with miscellaneous general merchandise and second class for the merchant 102(1) that is associated with grocery stores and supermarkets, the payment processing system 108 may select the second class for the merchant 102(1). The payment processing system 108 can select the second class based on a determination that customers are more likely to shop for groceries at grocery stores and supermarkets, rather than miscellaneous general merchandise stores. As such, classifying the merchant as a grocery store or supermarket is beneficial to the merchant 102(1) since it brings more customers to the merchant's 102(1) establishment.

Additionally, the payment processing system 108 can allow the merchant 102(1) to select a class from the one or identified classes. For instance, the payment processing system 108 can send a message indicating the identified classes to the POS device 104(1) of the merchant 102(1). The POS device 104(1) can then provide the merchant 102(1) with a classification interface 128 that includes the current classification 130 for the merchant 102(1) and the identified classifications 132 for the merchant. The merchant 102(1) can then use the classification interface 128 to select one of the identified classifications 132. In response, the POS device 104(1) can then send a message indicating the selection to the payment processing system 108 so that the payment processing system 108 can classify and/or reclassify the merchant 102(1) using the selected class.

Although not illustrated in FIG. 1, the payment processing system 108 can perform the techniques described above to each of the other merchants 102(2)-(3). For instance, the payment processing system 108 can use data received from the other merchants 102(2)-(3) and/or a generated business profile for each of the other merchant 102(2)-(3) to determine whether the other merchants 102(2)-(3) are classified in the correct class and/or the class that is most beneficial to the merchants 102(2)-(3). The payment processing system 108 can then flag any merchants 102(1)-(3) that are not classified in the correct class and/or the class that is most beneficial to the merchants 102(1)-(3). Finally, the payment processing system 108 can reclassify one or more of the flagged merchants 102(1)-(3) within a new class.

Figure 2:
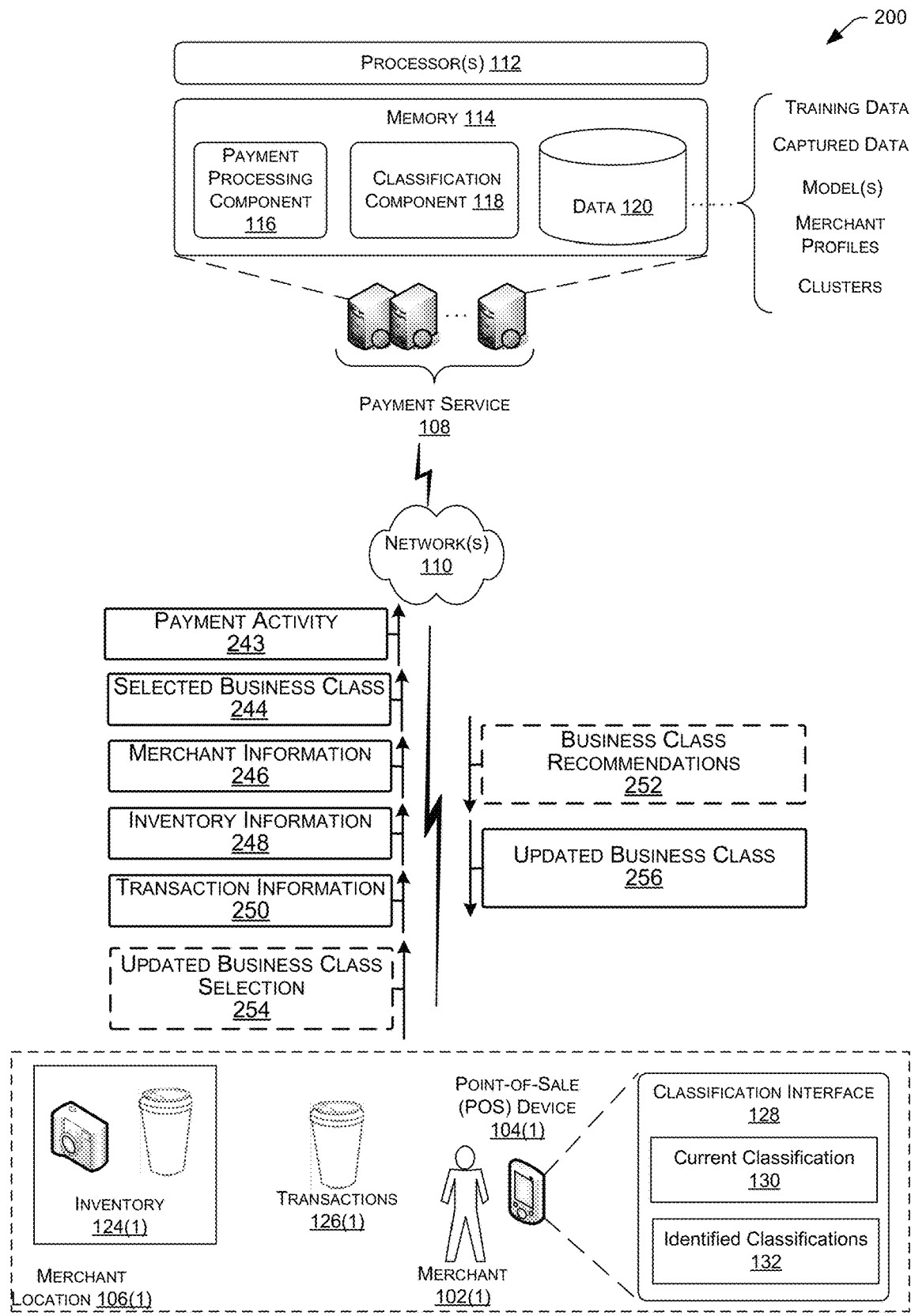
FIG. 2 illustrates an example that includes a merchant sending data to a payment processing system and in response, receiving an updated classification from the payment processing system. In this example, the data includes a selected class, and payment activity, such as merchant information, inventory information, and transaction information.

FIG. 2 illustrates an example that includes the merchant 102(1) sending data to the payment processing system 108 and in response, receiving an updated classification from the payment processing system 108. In this example, the data includes both reported data and collected data. For instance, the reported data in FIG. 2 includes a selected class 244, merchant information 246, and inventory information 248. The collected data includes transaction information 250.

The selected class 244 can include the class that the merchant 102(1) selects at the time the merchant 102(1) is first required to select a class and/or the current class assigned to the merchant 102(1). For instance, credit card companies may require the merchant 102(1) to select a class (e.g., MCC) when the merchant 102(1) starts accepting cards from the credit card companies as a form of payment. As such, the merchant 102(1) can select the selected class 244, which can then be reported to the payment processing system 108.

The merchant information 246 can include general information about the merchant 102(1). For instance, the merchant information 246 can include a business name of the merchant 102(1), the geographical location (e.g., merchant location 106(1)) of the merchant 102(1), an email address of the merchant 102(1), or other sorts of general information that the merchant 102(1) can send to the payment processing system 108. Additionally, the inventory information 248 can include information corresponding to the inventory 124(1) that the merchant 102(1) offers to customers. For instance, the inventory information 248 can include a cluster of items and/or services that the merchant 102(1) offers to customers.

The transaction information 250 can include payment activity for the merchant 102(1) and/or a cluster of items that the merchant 102(1) provides (e.g., sells, leases, rents, etc.) to customers. The payment activity can include the revenue of the merchant 102(1), percentage of tips that the merchant 102(1) receives, ticket sizes for the merchant 102(1), and/or volumes of items customers acquire from the merchant 102(1). The cluster of items the merchant 102(1) provides to the customers can include each of the transactions 126(1) that the merchant 102(1) has with customers for good and/or services.

FIG. 2 further illustrates that the payment processing system 108 may optionally send class recommendations 252 to the POS device 104(1) of the merchant 102(1). For instance, the payment processing system 108 can use the selected class 244, the merchant information 246, the inventory information 248, and the transaction information 250 to identify one or more classes for the merchant 102(1). The one or more classes may include the selected class 244, or the one or more classes may not include the selected class 244. Either way, the payment processing system 108 can send the one or more classes as class recommendations 252 to the POS device 104(1) of the merchant 102(1). The merchant 102(1) can then select one of the classes using the POS device 104(1) and send a message indicating the selected class to the payment processing system 108, where the message corresponds to updated class selection 254.

FIG. 2 further illustrates the payment processing system 108 sending an updated class 256 to the POS device 104(1) of the merchant 102(1). For instance, the payment processing system 108 may implement one or more of the selection rules described above and/or the updated business selection 254 to classify or reclassify the merchant 102(1) within a class. The payment processing system 108 can then send the class to the POS device 104(1) of the merchant as updated class 256.

FIG. 3 illustrates an example merchant classification interface 128 that the POS device 104(1) of the merchant 102(1) can display, where the merchant classification interface 128 includes a four identified classes for the merchant's 102(1). FIG. 3 illustrates, for instance, where the payment processing system 108 sends the class recommendation 252 to the merchant 102(1) based on the payment processing system 108 identifying that the merchant 102(1) is classified within the wrong class. For example, the payment processing system 108 may have identified each of class 5411, class 5462, class 5499, and class 5914 for the merchant 102(1) based on the reported data, the collected data, and/or the third-party data described above.

For instance, the merchant 102(1) may have originally selected class 5399 based on the inventory 124(1) of the merchant 102(1). Class 5399 corresponds to businesses that offers miscellaneous general merchandise, such as the electronics and the food of inventory 124(1). However, the payment processing system 108 can use the collected data from the merchant 102(1) to determine that the vast majority of the items that the merchant 102(1) actually provides (e.g., transactions 126(1)) is food. Therefore, the payment processing system 108 can identify classes that better classify the merchant's 102(1) business based on the collected data. The payment processing system 108 can then send the identified classes to the POS device 104(1) of the merchant 102(1) so that the merchant 102(1) can select a new class.

For example, the identified classes for the merchant 102(1) include class 5411, which is associated with grocery stores and supermarkets, class 5462, which is associated with bakeries, class 5499, which is associated with miscellaneous food stores, and class 5914, which is associated with fast food restaurants.

Figure 4A:
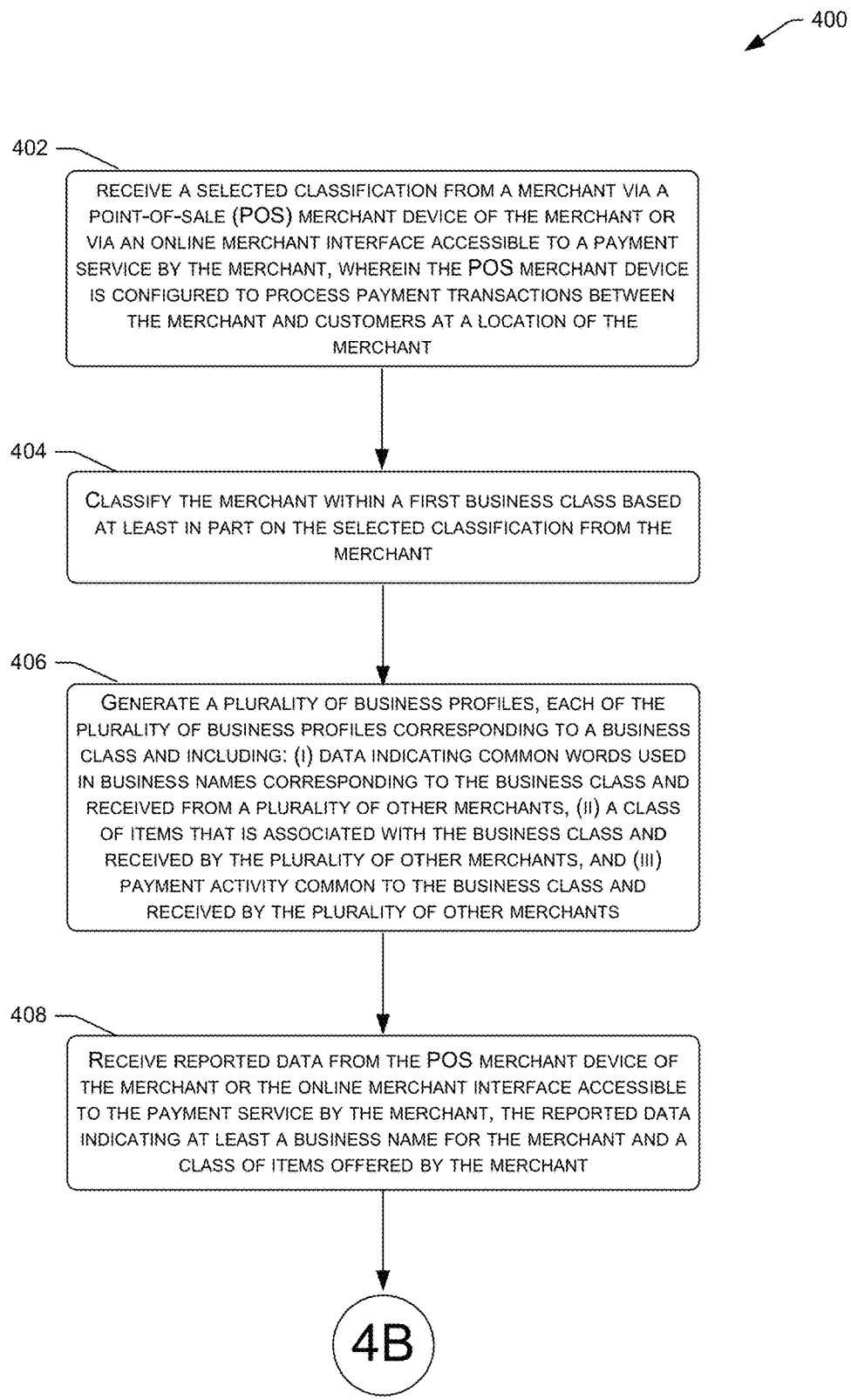
FIGS. 4A-4B illustrate a flow diagram of a process for reclassifying a merchant within a new class.
Figure 4B:
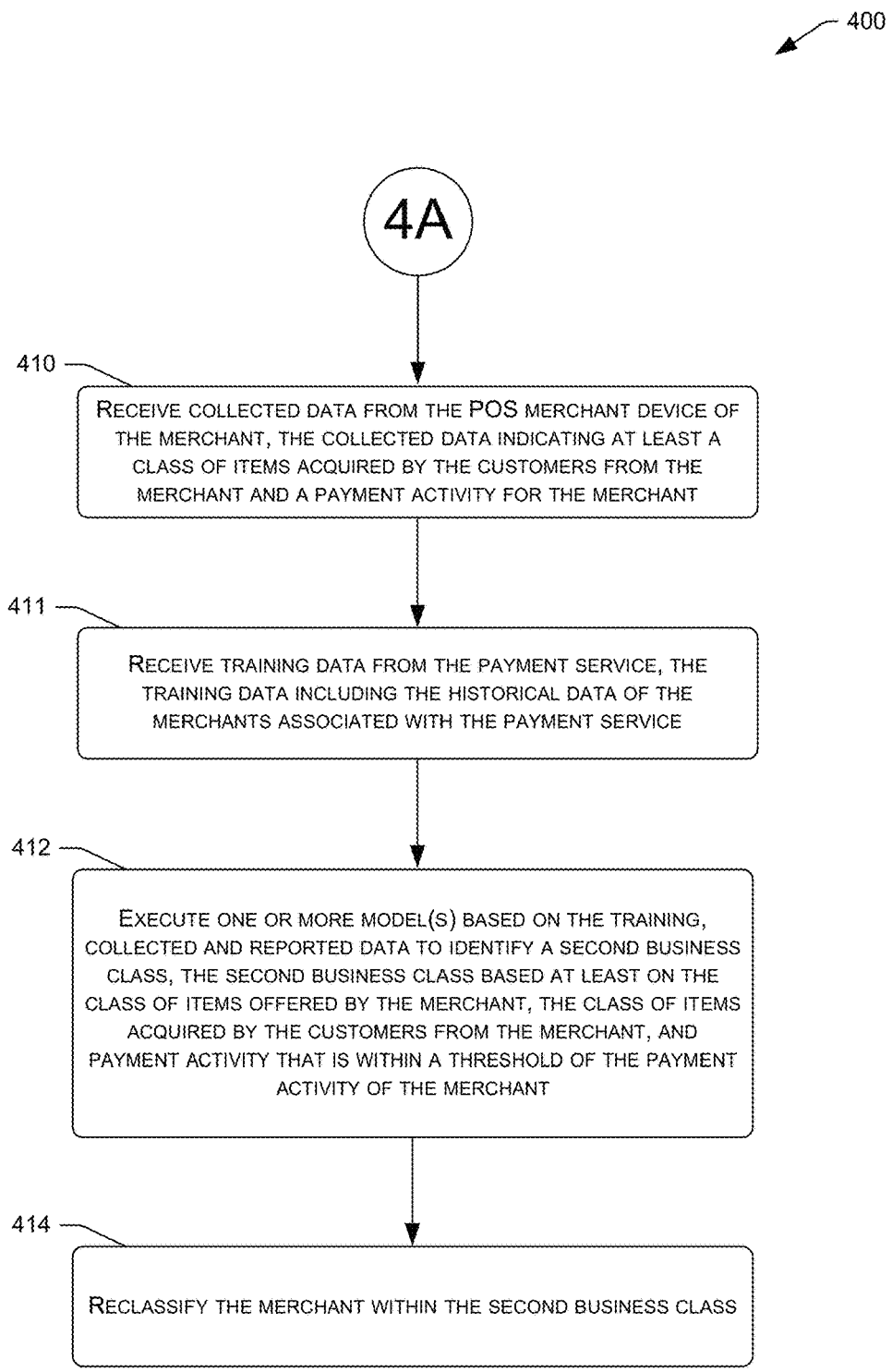

FIGS. 4A-4B illustrate a flow diagram of a process for reclassifying a merchant within a new class. The process 400 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 400, and other processes described herein, may be performed by a POS device, by a remote payment processing system (e.g., payment processing system 108), by another entity, or by a combination thereof.

At 402, the process 400 receives a selected classification from a merchant via a point-of-sale (POS) merchant device of the merchant or via an online merchant interface accessible to a payment processing system by the merchant, wherein the POS merchant device is configured to process payment transactions between the merchant and a customer at a location of the merchant. For instance, the merchant can select the selected classification at the time of signing up for the payment service or when the merchant starts accepting credit cards as a form of payment. The payment processing system can then receive the selected classification from the merchant.

At 404, the process 400 classifies the merchant within a first class based at least in part on the selected classification from the merchant. The payment processing system can classify the merchant in a first class based at least in part on the selected classification.

At 406, the process 400 generates a plurality of profiles, each of the plurality of profiles corresponding to a class and including: (i) data indicating common words used in business names corresponding to the class and received from a plurality of other merchant, (ii) a cluster of items that is associated with the class and received by the plurality of other merchants, and (iii) payment activity common to the class and received by the plurality of other merchants. For instance, the payment processing system can generate the plurality of profiles using data that the payment processing system receives from merchants classified within each of the profiles.

At 408, the process 400 receives reported data from the POS merchant device of the merchant or the online merchant interface accessible to the payment processing system by the merchant, the reported data indicating at least a business name for the merchant and a cluster of items offered by the merchant. For instance, the payment processing system can receive the reported data from the POS device of the merchant or the online merchant interface accessible to the payment processing system by the merchant.

At 410, the process 400 receives collected data from the POS merchant device of the merchant, the collected data indicating at least a cluster of items acquired by customers from the merchant and a payment activity for the merchant. For instance, the payment processing system can receive the collected data from the POS device of the merchant.

At 411, the process 400 receives training data from the payment service, the training data includes historical data related to payment activity across all merchants or merchants relevant to the specific merchant. The classification component may train a data model based on a plurality of training data items such that, given a new input of content associated with a website, the data model may output a complexity score associated with the website. In at least one example, the classification component may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The component 118 may receive updated training data after a lapse of a predetermined period of time, at a particular frequency, etc. The updated training data may include additional and/or alternative data associated with previously analyzed merchants and complexity scores associated with such merchants.

At 412, the process 400 executes one or more machine learning models or heuristic models on the training data, the reported data and/or the collected data for the merchant to the plurality of profiles to identify a second class, the second class including at least one of a common word used in a business name that is included in the business name of the merchant, the cluster of items offered by the merchant, the cluster of items acquired by customers from the merchant, and payment activity that is within a threshold of the payment activity of the merchant. For instance, the payment processing system can compare the reported data and the collected data for the merchant to the plurality of profiles to identify the second class for the merchant.

At 412, the process reclassifies the merchant within the second class. For instance, the payment processing system can reclassify the merchant within the second class. In some examples, the payment processing system reclassifies the merchant in response to identifying the second cluster or even a class within the cluster. As used herein, a cluster can include several classes.

Figure 5:
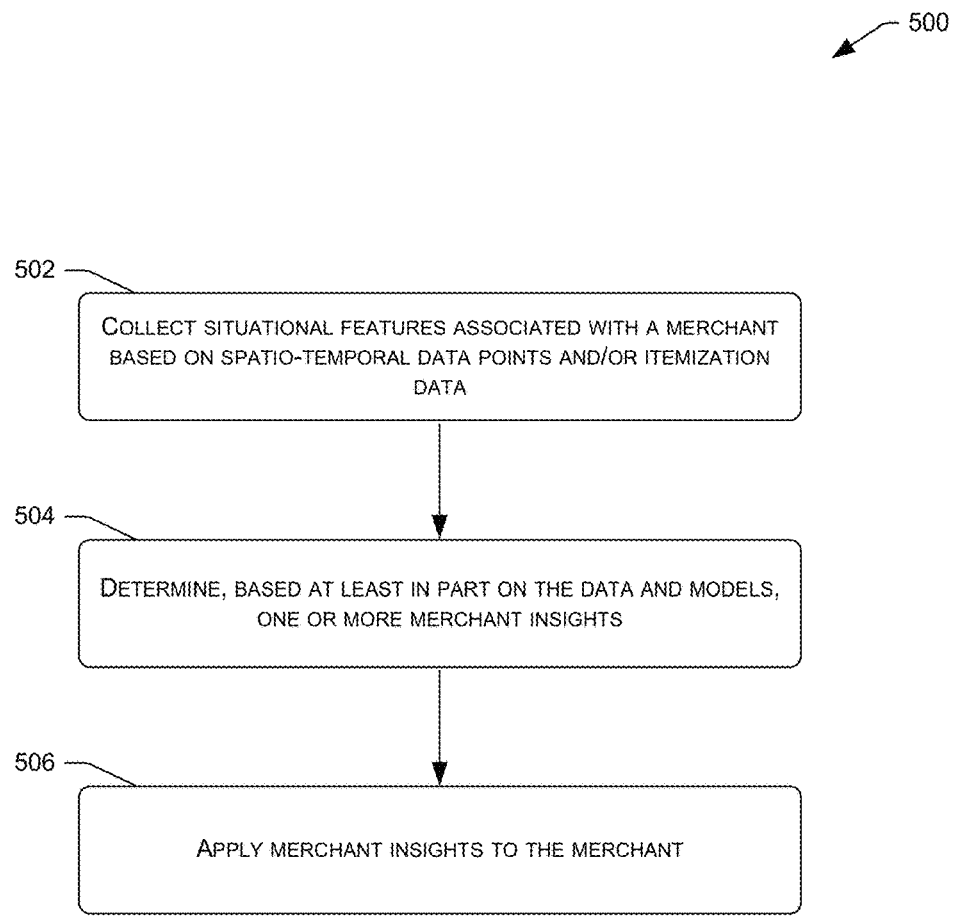
FIG. 5 illustrates a flow diagram of a process for classifying a merchant within a class using data associated with the merchant.

FIG. 5 illustrates a flow diagram of a process 500 for classifying a merchant within a class using data associated with the merchant. At 502, the process 500 collects data associated with a merchant. For instance, a payment processing system and/or a POS device of the merchant can collect data associated with the merchant. As discussed above, the data can include reported data, collected data, and third-party data. In one implementation, the data includes spatio-temporal data and situational features obtained from the spatio-temporal data.

In one implementation, geo-location data includes location of payment hardware, merchants, buyers, and other associated entities. The location may be location derived from the payments and web session IP addresses of the devices. Geolocation can be summarized in several ways, for example using geohashing. Through geolocation, various businesses can be captured, such as but not limited to: fixed, sequentially fixed, most fixed but with occasional flights, onsite appointment based businesses, randomly mobile like plumbers, constantly mobile like salesperson, and others. In one implementation, location clusters can be formed by returning a set of connected components using geohashes at some resolution. Often the most popular location for a business is not the most common. For example, many food trucks follow a common behavioral motif—location A, location B, location C, back to location A. However, mixed in with these structural locations are a scattering of random, stochastic, one-off locations. If one of these one-off locations is a concert or other large event, it may register more transactions than their normal behavior. So flights aim to capture the places where they spend the most time before moving. In one implementation, N-grams can be formed in a sort of vocabulary capturing method. Alternatively, location can be summarized using one or more of hour-of-day/day-of-week geohashes, common starting locations, common ending locations, most common location by time spent, and most common location by payments processed Similarly, the timing and sequential patterns contain a wealth of information about a business ranging from type of business and operating hours to busy times and seasonality. A business's payment activity, which is often driven by fundamental human behaviors related to food (coffee, lunch, dinner), work (happy hour) and other aspects of human life, may help establish businesses patterns that are fed into the system and used to establish a proper classification.

Similarly, the spectral data in a payments context includes intermittent time distributions contain information about the typical flow of operations, the type of business, normal and abnormal behaviors, number of employees, and seasonality amongst other things.

Different businesses have different inter-payment signatures. Coffee shops probably have very few minutes between transactions. Hair salons may have 30 minutes to 2 hours between payments. Furthermore, the average time between payments is probably similar for similar types of businesses—so coffee shops probably wind up looking like other coffee shops from this point of view and restaurants look like other restaurants. Such features can be used to classify merchants for example by posing modeling questions such as: peak payments activity, item requested during peak hours, etc.

At 504, the process 500 determines, based at least in part on the data, merchant insights such as at least one class for the merchant. For instance, the payment processing system and/or the POS device of the merchant can compare the data to a plurality of profiles in order to identify at least one class for the merchant. In comparing, the payment processing system and/or the POS device of the merchant can identify profiles that include similar data as the data associated with the merchant. In another implementation, the merchant insights include determining which among the merchant qualifies for loan or cash advances, or for a certain suite of payment products.

At 506, the process 500 classifies the merchant within a class from the at least one class. For instance, the payment processing system and/or the POS device of the merchant can implement one or more rules to select the class. As discussed above, the rules can cause the payment processing system and/or the POS device to select the class that is most beneficial to the merchant. For example, the rules can cause the payment processing system and/or the POS device to select the class that requires the merchant to pay the least amount in fees.

Figure 6A:
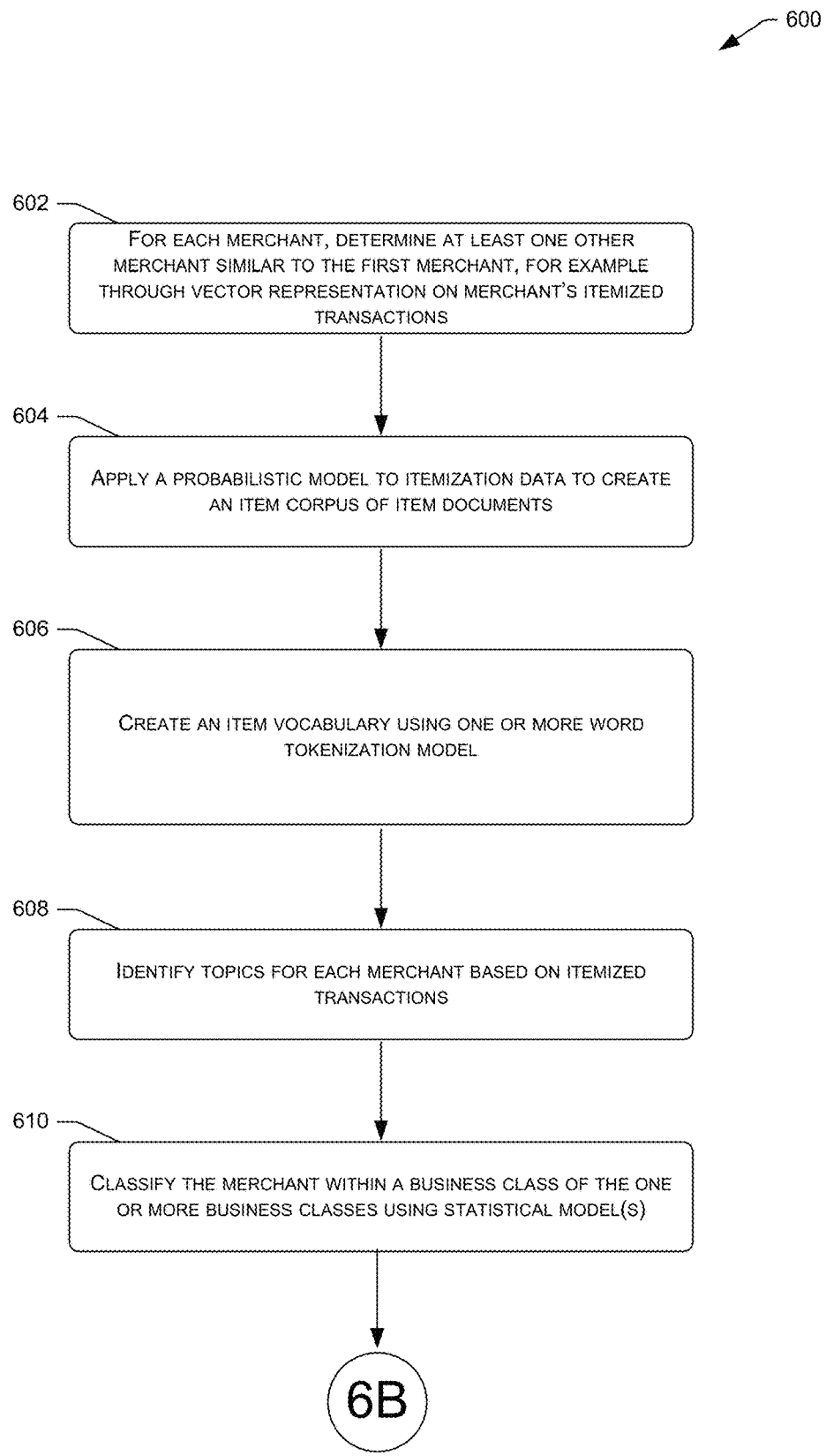
FIGS. 6A and 6B illustrate a non-limiting flow diagram illustrating a method for training a data model to determine a classification of a merchant.
Figure 6B:
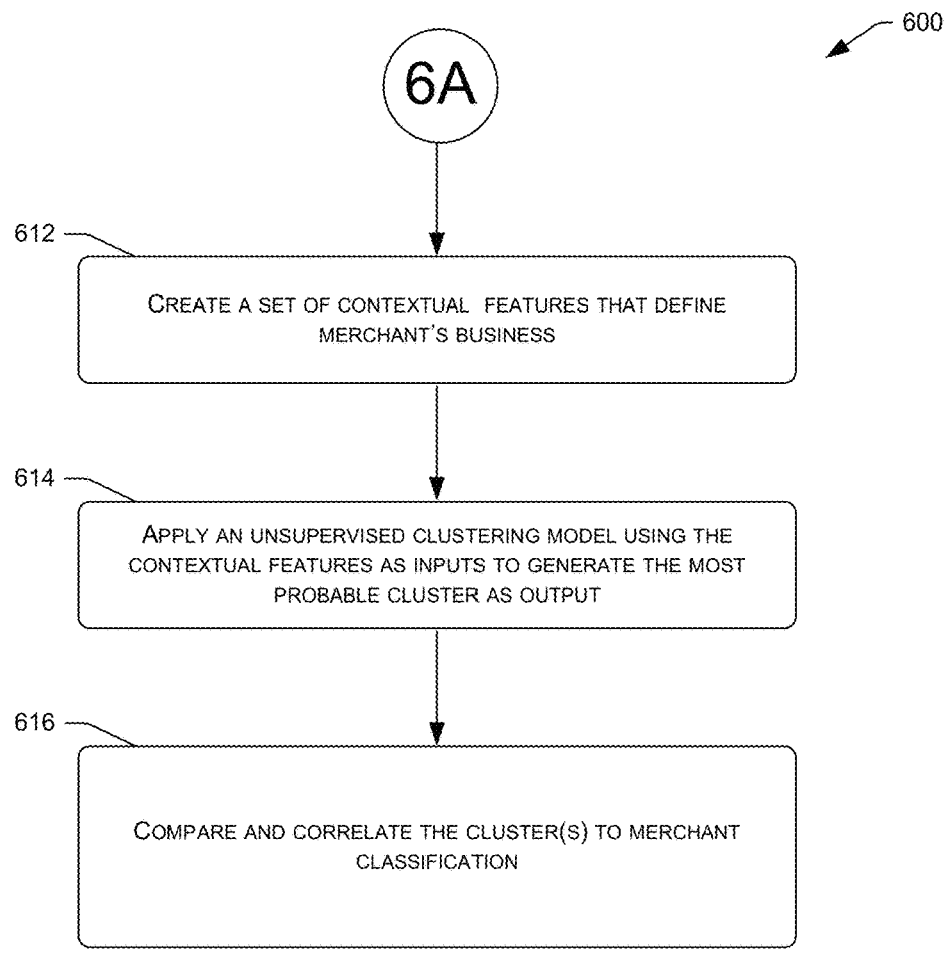

FIG. 6 illustrates a flow diagram of a process 600 for a payment processing system obtaining merchant insights and applying in one or more use cases, for example for classifying a merchant within a class using reported data, training data, and collected data from the merchant. At 602, the process 600 determines for each merchant, at least one other merchant or cluster of merchants relevant to the first merchant. For instance, in one implementation, merchants that are contextually similar can be determined based on heuristic models, machine learning, or deep learning models. The similarities can be expressed in terms of a dot product to determine nearest neighbors. In one implementation, the process 600 can apply Soft Max based classification or Metric Learning based classification to learn embeddings.

At 604, the process 600 applies a probabilistic model to itemization data to create an item corpus of item documents. For instance, the payment processing system can use an LDA model or a similar model to create an item corpus.

At 606, the process 600 creates an item vocabulary using at least one word tokenization model.

At 608, the process 600 identifies topics for each merchant based on itemized transactions.

At 610, the process 600 classifies the merchant within a class of the one or more classes or clusters including several classes. For instance, the payment processing system can classify the merchant within the class and/or reclassify the merchant within the class if the merchant is already classified in a different class.

At 612, the process 600 creates a set of contextual or situational features that define the merchant's business.

At 614, the process 600 applies an unsupervised clustering model using the contextual features as inputs to generate the most probable cluster as output.

At 616, the process 600 compares and correlates the clusters to merchant classification.

Figure 7:
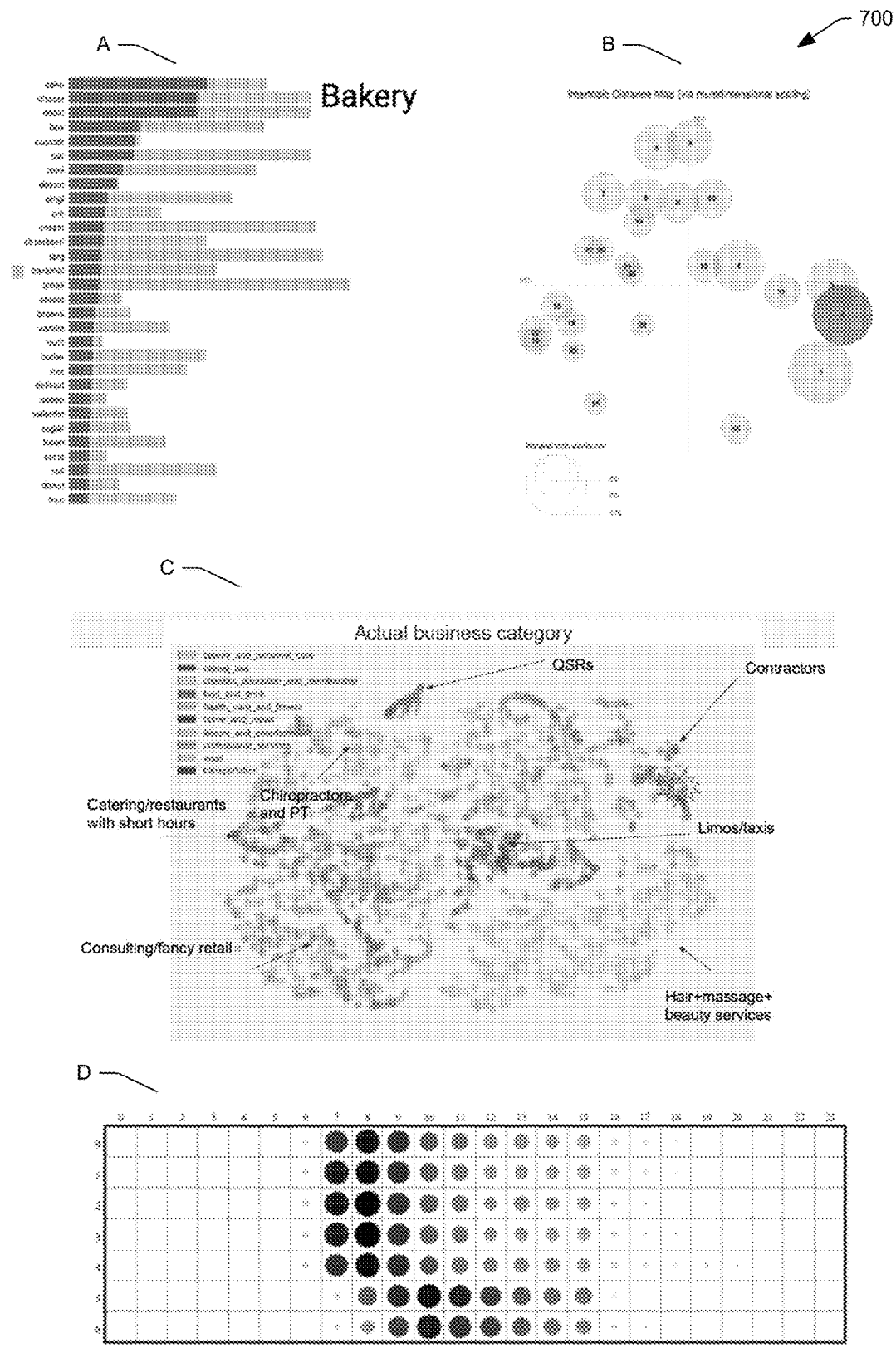
FIG. 7 illustrates graphical plots for indicating the clustering of merchants using machine learning models.

FIG. 7 illustrates graphical plots to illustrate some aspects of the clustering or classification of merchants. In one implementation, as shown in A, an LDA topic model can be used to tokenize the payment transactions. As shown, the topics for a bakery include cake, cookie, cupcake, bar, and so on. The graph shows the estimated term frequency within the selected topic versus the overall term frequency.

As shown in B, the intertopic distance map indicates the distance between various clusters as per multidimensional scaling. As such, the distance can also be used to determine contextually similar or neighboring merchants. For example, in one implementation, vector representation or heuristics can be used to determine similar merchants. These vector representations are usually learned in a particular context, such as in the course of predicting a certain classification problem.

As shown in C, the clustering is shown vis-à-vis other merchants in the payments landscape. As shown in D, the heat map of all merchant payment transactions by weekday and time illustrates how local timestamps of transactions can be used as a feature. For each merchant, we aggregated the percentage of their transactions taking place in each day and hour, essentially creating this heat map for each merchant and bundling merchants with similar heat map patterns. As seen in the figure, the peaks happen around 7 am in the hourly activity and may be consistent across all businesses of this type, for example coffee place, thus enabling one to cluster coffee place within the bucket of restaurants.

FIG. 8 illustrates graphical plots to illustrate some aspects of the clustering or classification of merchants. The figure uses payment activity at a café as an example. Imagine the time series of payments: (t1, p1), (t2, p2), (t3, p3) . . . , and monitor the time that passes between each payment—i.e. (t2-t1), (t3-t2). By plotting the time between payments (in seconds) over time, E emerges. As shown in E, On the left-hand side is the time difference in seconds and on the bottom, is the date. For example, the first big spike occurred when this Cafe shut down for the 4th of July and you have 222,616 seconds (~2.5 days) between their last payment on July 3rd and their next payment on July 5. Zooming into the figure yields F for a daily snapshot. This figure shows the inter payment time over several days in April. One thing becomes clear: April 3rd and April 10 are Sundays. This business must be closed on Sundays because there is a 125,000 second delay between sequential payments (~1.5 days). Also notice that the day following the large peak (i.e. April 6 & 13) is always larger than the subsequent 4 days. This is a business that opens for lunch, closes, and then opens again for dinner. They are closed on Sunday and only open for lunch on Monday. One can further notice that the intraday closing time by zooming in further. This intermittent time data to build a fingerprint for each business. The PDF (probability distribution function) for delta T (i.e. the time between payments) is now shown in G. Left axis is probability, bottom axis is time in seconds (between payments). The peak of the distribution is centered around 111 seconds (~1.8 minutes). That means that the activity of this business, when they are open and operating, can be characterized by a single number that describes the typical flow of their business. In this manner, each business can be fingerprinted, which can be applied to do a number of things:

Normal/Abnormal behavior: The largest/most-common peak in the spectrum (i.e. 111 seconds for Cotillion Cafe) captures the essential flow of the day to day operations for each business. Similar businesses should have similar first order peaks and therefore be able to cluster businesses based on their first order peaks. If a business claims to be a coffee shop, but their payment activity does not align with other coffee shops, it is possible that something fraudulent is occurring.

Customers Team (Marketing) may be interested in using this to predict when a merchant is going to have abnormal hours (e.g. closed during a holiday, or open during a holiday), to pre-create a marketing campaign for these merchants to send out to their buyers MCC assignment: Similar to the normal/abnormal behavior detection, the system is able to assign businesses to specific MCCs based on their dynamic fingerprint.

Establishment Metrics: When does a business establish? When the payment activity for a given business begins to resemble the dynamic fingerprint for their type of business?

Churn Detection: The "fingerprint" is may be a PDF (probability distribution function) for Delta Ts. The model can therefore answer the question: "Given that their last payment was at t0, what is the probability that they haven't processed a payment since?" If the probability is low, churn can be detected.

FIG. 9 illustrates select example components of an example POS device 900 according to some implementations. The POS device 900 may be any suitable type of computing device, e.g., mobile, semi-mobile, semi-stationary, or stationary. Some examples of the POS device 900 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 900 includes at least one processor 902, memory 904, a display 906, one or more input/output (I/O) components 908, one or more network interfaces 910, at least one card reader 912, at least one location component 914, and at least one power source 916. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the POS device 900, the memory 904 may be an example of tangible non-transitory computer storage media and may include volatile and nonvolatile memory and/or removable and non-removable media implemented in any type of technology for storage of information such as computer-readable processor-executable instructions, data structures, program components or other data. The memory 904 may include, but is not limited to, RAM, ROM, EEPROM, flash memory, solid-state storage, magnetic disk storage, optical storage, and/or other computer-readable media technology. Further, in some cases, the POS device 900 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, components or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the POS device 900. Functional components of the POS device 900 stored in the memory 904 may include a merchant application 918, which may interact with applications executing on client devices to allow customers to pay for items offered by the merchant. The merchant application 918 may present an interface on the POS device 900 to enable the merchant to conduct transactions, receive payments, and so forth, as well as communicating with the payment processing system 108 for processing payments and sending transaction information. Further, the merchant application 918 may present an interface to enable the merchant to manage the merchant's account, and the like. Finally, the merchant application 918 may send data associated with the merchant to the payment processing system, and receive one or more suggest classes from the payment processing system. After receiving the one or more suggested classes, the merchant application 918 can enable the merchant to select one of the classes and send the selection back to the payment processing system.

Additional functional components may include an operating system 920 for controlling and managing various functions of the POS device 900 and for enabling basic user interactions with the POS device 900. The memory 904 may also store transaction data 922 that is received based on the merchant associated with the POS device 900 engaging in various transactions with customers, such as the example customer from FIG. 1.

In addition, the memory 904 may also store data, data structures and the like, that are used by the functional components. For example, this data may include item information that includes information about the items offered by the merchant, which may include images of the items, descriptions of the items, prices of the items, and so forth. Depending on the type of the POS device 900, the memory 904 may also optionally include other functional components and data, which may include programs, drivers, etc., and the data used or generated by the functional components. Further, the POS device 900 may include many other logical, programmatic and physical components, of which those described are merely examples that are related to the discussion herein.

The network interface(s) 910 may include one or more interfaces and hardware components for enabling communication with various other devices over the network or directly. For example, network interface(s) 910 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the POS device 900 may include the display 906 mentioned above. Depending on the type of computing device used as the POS device 900, the display 906 may employ any suitable display technology. For example, the display 906 may be a liquid crystal display, a plasma display, a light emitting diode display, an OLED (organic light-emitting diode) display, an electronic paper display, or any other suitable type of display able to present digital content thereon. In some examples, the display 906 may have a touch sensor associated with the display 906 to provide a touchscreen display configured to receive touch inputs for enabling interaction with a graphic interface presented on the display 906. Accordingly, implementations herein are not limited to any particular display technology. Alternatively, in some examples, the POS device 900 may not include the display 906, and information may be present by other means, such as aurally.

The I/O components 908, meanwhile, may include speakers, a microphone, a camera, and various user controls (e.g., buttons, a joystick, a keyboard, a keypad, etc.), a haptic output device, and so forth.

In addition, the POS device 900 may include or may be connectable to a payment instrument reader 912. In some examples, the reader 912 may plug in to a port in the merchant device, such as a microphone/headphone port, a data port, or other suitable port. In other instances, the reader 912 is integral with the entire POS device 900. The reader 912 may include a read head for reading a magnetic strip of a payment card, and further may include encryption technology for encrypting the information read from the magnetic strip. Alternatively, numerous other types of card readers may be employed with the POS devices 900 herein, depending on the type and configuration of a particular POS device 900.

The location component 914 may include a GPS device able to indicate location information, or the location component 914 may comprise another other location-based sensor. The POS device 900 may also include one or more additional sensors (not shown), such as an accelerometer, gyroscope, compass, proximity sensor, and the like. Additionally, the POS device 900 may include various other components that are not shown, examples of which include removable storage, a power control unit, and so forth.

Figure 10:
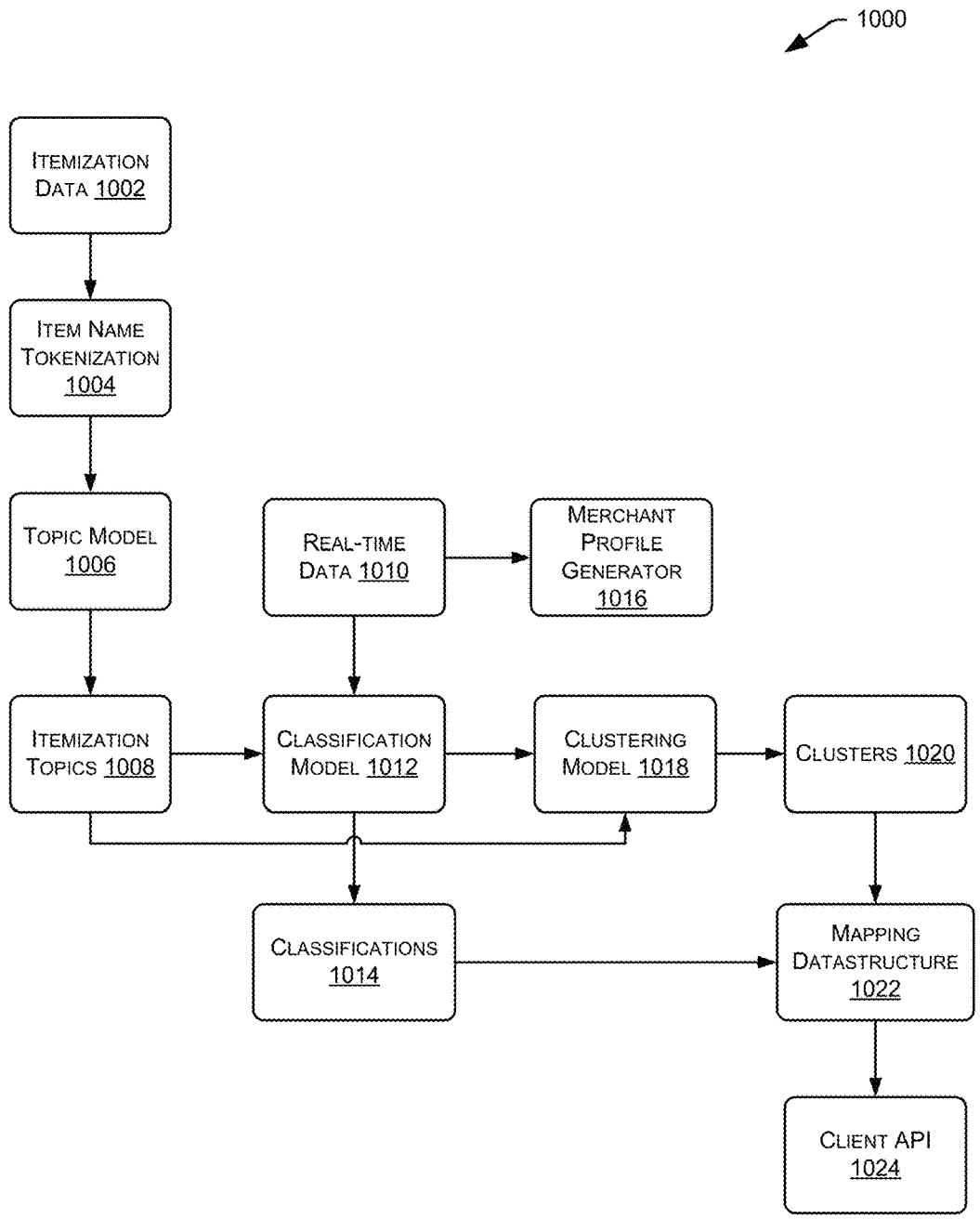
FIG. 10 illustrates architecture within the payment service to implement the machine learning aspects of clustering merchants, for example for merchant classification.

FIG. 10 further illustrates an exemplary architecture that can be implemented to automate the classification and/or reclassification of merchants based on merchant insights. In one implementation, the machine learning powered payment service 1000, similar to payment service 108, starts with raw data and/or system level pre-aggregated data to perform additional data transformation using user-defined functions, e.g., pre-processing of features. At the end of the pre-processing step, the features of a training dataset to be used in the machine learning model can be stored in a separate data structure for future iterations and analytics diagnostics.

In one implementation, the payment service 1000 applies an LDA topic model 1006 to itemization data 1002 to create item name embeddings for each seller and itemization topic 1008. In this approach, the payment service 100 creates an item 'document' based on a given seller's historical itemized transactions. These item 'documents' form an item corpus. The service 1000 then uses this corpus to create a seller item vocabulary using various word tokenization techniques, for example natural language processing techniques. The payment service 1000 then uses an LDA model to iteratively generate the word embeddings for each topic belong to a predetermined number of topics. At the end of this generative process, sellers with previous itemized transactions are assigned to the most likely topic(s). In one example, since food and drink sellers are more likely to itemize, and so may be over-indexed among topics.

Reclassification 1016 of sellers can be accomplished by a Random Forest classification model 1012 that predicts 'food business category' based on real-time snapshots 1010 and aggregated data features 1002 obtained from payment activity. Business category may be chosen rather than business type because there are too many legacy and one-off types in data. Training may take place on established sellers with a few minimum activity requirements (for example greater than 50 payment counts and $10 k annualized GPV). In one implementation, the model has an average accuracy of ~65% across business categories. Categories with very consistent seller activity are easy to predict (beauty and personal care~90%), while more nebulous categories are harder to predict (professional services~45%).

After engineering an intuitive set of contextual features that define a seller's JTBD, the payment service 1000 applies an unsupervised clustering model 1018 that takes the payment features as input and outputs the seller's most probable cluster 1020. These clusters will be correlated to MCC through mapping datastructure 1022, since most clusters will only use one or two MCCs overrepresented, but will also illuminate similarities across MCCs and differences within MCCs. For example, a cluster with high $ CNP, mobile payments, payment a few times a day might have mostly home and repair and professional services MCC.

Another cluster might consist of only QSRs, well defined by the payment activity, while some FSRs might be clustered with retail sellers.

The clusters can be further analyzed from the perspective of products offered to the seller clusters (e.g. maybe nail salons find the most success with Appointments, Payroll and Capital based products). Alternatively, the sellers can be targeted with products accordingly.

In another implementation, other components within payment service 1000 can request the itemization topic, seller MCC and most likely JTBD cluster for a given seller at real-time. This is accomplished via a key value store that can take a collection of merchant tokens as input keys and return the model prediction as output values. For example, the key value stores can be associated with client API support that can be leveraged to serve this purpose. The three anticipated key value pairs are illustrated in the below schema.

seller_itemization_topics

| Key | Value | Data Type |
| --- | --- | --- |
| best_available_merchant_token | most_likely_topic_id | STRING | seller_mccs

| Key | Value | Data Type |
| --- | --- | --- |
| best_available_merchant_token | most_likely_mcc | STRING | seller_jtbd_clusters

| Key | Value | Data Type |
| --- | --- | --- |
| best_available_merchant_token | most_likely_cluster | STRING |

Clusters can be visualized as a means of data exploration and model validation, for example via client API 1024. It can also be offered as a non-black box medium for analysts that are not familiar with machine learning algorithms to learn about the machine learning output. For example, a tensor board to visualize seller cluster and extract insights and data stories for presentations can be used.

The payment service applies one or more methods to cluster and/or classify merchants. For example, in one implementation, a method implemented by a payment processing system, the method comprising: receiving a selected classification from a merchant via one or more point-of-sale (POS) devices of the merchant or via an online merchant interface, wherein the POS device is configured to process one or more payment transactions between the merchant and customers of the merchant; accessing the selected classification of the merchant, wherein the selected classification is based at least in part on merchant category code (MCC) or revenue; obtaining itemization data pertaining to historical itemized transactions corresponding to a plurality of merchants; obtaining data corresponding to behavior of the merchant, wherein the behavior relates to frequency, sequence, timing, and/or location of payment transactions accepted at the POS devices or the online merchant interface; generating a set of features by tokenizing the itemization data and the data corresponding to the behavior; determining, using a classification model, a subset of features from amongst the set of features based on a comparative ranking of the features; applying the subset of features to an unsupervised clustering model; predicting, through the unsupervised clustering model, at least one cluster for the merchant, wherein the predicted cluster relates to a merchant classification and has a probability higher than a threshold; comparing the predicted cluster to the selected classification; and if the predicted cluster is different from the selected classification, reclassifying the merchant based on the predicted cluster instead of the selected classification.

The subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method for reclassifying a merchant implemented by one or more computing devices associated with a payment processing service, the method comprising:
   obtaining merchant information corresponding to a merchant of a plurality of merchants associated with a payment processing service, wherein obtaining comprises:
      receiving, by the one or more computing devices, a selected classification from the merchant via a point-of-sale (POS) application associated with a POS device operable by the merchant or via an online merchant interface, wherein the selected classification is based at least in part on at least one of a merchant category code (MCC) of the merchant or revenue of the merchant;
      accessing, from a merchant database maintained by the one or more computing devices, the selected classification of the merchant, wherein the selected classification is associated with (i) a first risk level and (ii) a first fee rate charged to the merchant by a card network;
      obtaining, by the one or more computing devices and from the merchant database, transaction data pertaining to one or more merchant payment transactions between the merchant and customers of the merchant, wherein the one or more merchant payment transactions are processed by the payment processing service on behalf of the merchant and wherein the transaction data pertaining to the one or more merchant payment transactions includes data associated with at least one of items, frequency, sequence, timing, or location of the one or more merchant payment transactions;
   generating, by the one or more computing devices, a set of features associated with the merchant and based at least in part on tokenizing the transaction data, wherein the set of features comprise at least one of attributes of the one or more merchant payment transactions or attributes of the merchant;
   training, by the one or more computing devices and using a machine learning mechanism and a set of training data, a classification model, wherein the set of training data comprises one or more of:
      classifications corresponding to one or more merchants of the plurality of merchants; or
      transaction data for historical payment transactions processed by the payment processing service on behalf of the one or more merchants, wherein the transaction data for the historical payment transactions includes data associated with at least one of items, frequency, sequence, timing, or location of the historical payment transactions, and wherein the one or more merchant payment transactions are exclusive of or included in the historical payment transactions,
wherein the machine learning mechanism comprises one or more of a supervised learning algorithm, an unsupervised learning algorithm, a semi-supervised learning algorithm, or a deep learning algorithm;
determining, by the one or more computing devices and based at least in part on executing the classification model, a subset of features from the set of features based at least in part on a comparative ranking of each feature in the set of features;
determining, by the one or more computing devices, a score for the merchant, wherein the score is representative of a relevance of payment activity of the merchant with respect to payment activities of a subset of similar merchants identified from the plurality of merchants;
predicting, by the one or more computing devices and based on applying individual features of the subset of features to an unsupervised clustering model, a most probable cluster from a plurality of clusters associated with the merchant, wherein the most probable cluster corresponds to the score;
determining, by the one or more computing devices, whether a correlation exists between the most probable cluster and the selected classification based at least in part on comparing a new merchant classification represented in the most probable cluster to the selected classification;
based on determining that the selected classification lacks the correlation with the most probable cluster, reclassifying, by the one or more computing devices, the merchant within the merchant database from the selected classification to the new merchant classification, wherein the new merchant classification is associated with (i) a second risk level and (ii) a second fee rate charged to the merchant by the card network, and wherein the second risk level is different from the first risk level and the second fee rate is different from the first fee rate; and
processing, by the one or more computing devices, a payment corresponding to a new merchant payment transaction conducted at the POS device operable by the merchant, wherein the payment is processed using the new merchant classification obtained from the merchant database, the second risk level, and the second fee rate.

2. The method of claim 1, further comprising:
generating, based at least in part on the most probable cluster, a business profile for the merchant from amongst a set of business profiles, wherein the generating comprises obtaining:
data from the one or more merchant payment transactions accepted at the POS device or the online merchant interface; and
data aggregated over time from the one or more merchant payment transactions.

3. The method of claim 1, further comprising:
determining, using a multi-class classification model, an importance score associated with each of the features of the set of features; and
wherein the comparative ranking of the individual features in the set of the features is based at least in part on the importance score.

4. The method of claim 1, further comprising:
receiving data from customer reviews for the merchant, data from third-party websites, and data from a website of the merchant; and
wherein the new merchant classification is based at least in part on the data from the customer reviews for the merchant, the data from the third-party websites, and the data from the website of the merchant.

5. One or more non-transitory computer-readable media storing computer-executable instructions that, when executed by one or more processors, cause the one or more processors to reclassify a merchant by performing acts comprising:
obtaining, by a plurality of computing devices associated with a payment service, merchant information corresponding to a merchant, wherein obtaining comprises:
collecting, by the plurality of computing devices, merchant transaction data corresponding to one or more merchant payment transactions between the merchant and customers of the merchant, wherein the one ore more merchant payment transactions are processed by the payment service, wherein the merchant transaction data is received via a point-of-sale (POS) application of a POS device associated with the merchant and indicates at least one of items, frequency, sequence, timing, or location of the one or more merchant payment transactions;
training, by the plurality of computing devices and using a machine learning mechanism and a set of training data, a statistical model, wherein the set of training data comprises one or more of:
classifications corresponding to one or more merchants associated with the payment service; or
transaction data for historical payment transactions processed by the payment service on behalf of the one or more merchants, wherein the transaction data includes data associated with at least one of items, frequency, sequence, timing, or location of the historical payment transactions, and wherein the one or more merchant payment transactions are exclusive of or included in the historical payment transactions,
wherein the machine learning mechanism comprises one or more of a supervised learning algorithm, an unsupervised learning algorithm, a semi-supervised learning algorithm, or a deep learning algorithm;
applying, by the plurality of computing devices, the statistical model using the merchant transaction data as input and obtaining output comprising an indication of similar merchants of the one or more merchants, wherein the similar merchants are within a threshold amount of similarity to the merchant;
determining, by the plurality of computing devices, at least one segmentation associated with the similar merchants;
identifying a difference between the at least one segmentation and a previously selected classification within a merchant database maintained by the plurality of computing devices;
based on the difference between the at least one segmentation and the previously selected classification, reclassifying the merchant, by the plurality of computing devices and within the merchant database,
from the previously selected classification to a new merchant classification; and
processing, by the plurality of computing devices, a payment corresponding to a new merchant payment transaction conducted at the POS device associated with the merchant, wherein the payment is processed using the new merchant classification obtained from the merchant database.

6. The one or more non-transitory computer-readable media of claim 5, wherein at least one of:
the new merchant classification corresponds to a first fee rate charged to the merchant by a card network, wherein the first fee rate is lower than a second fee rate corresponding to the previously selected classification; or
the new merchant classification corresponds to a first level of risk associated with the merchant, wherein the first level of risk is lower than a second level of risk corresponding to the previously selected classification.

7. The one or more non-transitory computer-readable media of claim 6, the acts further comprising:
receiving data corresponding to one or more reviews associated with the merchant, one or more websites associated with the merchant, and one or more job descriptions from the merchant; and
wherein reclassifying the merchant is further based at least in part on the received data.

8. The one or more non-transitory computer-readable media of claim 7, the acts further comprising:
determining, using a multi-class classification model, an importance score associated with the received data;
creating a ranking of the received data in order of the importance score; and
wherein the reclassifying the merchant is based at least in part on the ranking.

9. The one or more non-transitory computer-readable media of claim 5, wherein the transaction data for the historical payment transactions comprises transaction data obtained from the one or more merchants in real-time and aggregated by the payment service.

10. The one or more non-transitory computer-readable media of claim 5, wherein training the statistical model further comprises:
applying a tokenization model to create an item vocabulary;
identifying one or more topics for each merchant of the one or more merchants; and
obtaining a set of contextual features based at least in part on the one or more topics.

11. The one or more non-transitory computer-readable media of claim 5, the acts further comprising:
continuing to collect additional transaction data associated with the one or more merchants; and
retraining the statistical model, at given time intervals, with the collected additional transaction data.

12. The one or more non-transitory computer-readable media of claim 5, wherein the machine learning mechanism comprises a support vector machine merchants.

13. The one or more non-transitory computer-readable media of claim 5, the acts further comprising analyzing the at least one segmentation for at least one of: merchant classification code (MCC) labeling, risk modeling, metric establishment, churn detection, seasonality detection, account takeover detection, customer targeting, merchant targeting, or product placement.

14. A system for reclassifying merchants comprising:
one or more processors; and
one or more computer-readable media storing instructions that, cause the one or more processors to perform acts comprising:
obtaining, by one or more computing devices associated with a payment service, merchant information corresponding to a merchant of a plurality of merchants associated with the payment service, wherein obtaining comprises:
receiving, by one or more computing devices, merchant transaction data corresponding to one or more merchant payment transactions between the merchant and customers of the merchant, wherein the one or more merchant payment transactions are processed by the payment service, wherein the merchant transaction data is received via a point-of-sale (POS) application of a POS device associated with the merchant and indicates at least one of items, frequency, sequence, timing, or location of the one or more merchant payment transactions;
training, by the one or more computing devices and using a machine learning mechanism and a set of training data, a statistical model, wherein the set of training data comprises one or more of:
classifications corresponding to one or more merchants of the plurality of merchants; or
transaction data for historical payment transactions processed by the payment service on behalf of the one or more merchants, wherein the transaction data includes data associated with at least one of items, frequency, sequence, timing, or location of the historical payment transactions, and wherein the one or more merchant payment transactions are exclusive of or included in the historical payment transactions, wherein the machine learning mechanism comprises one or more of a supervised learning algorithm, an unsupervised learning algorithm, a semi-supervised learning algorithm, or a deep learning algorithm;
applying, by the one or more computing devices, the statistical model to determine one or more similar merchants of the one or more merchants, wherein the similar merchants are within a threshold amount of similarity to the merchant;
based on determining the one or more similar merchants, including the merchant in a cluster associated with the similar merchants;
analyzing, by the one or more computing devices, the cluster for use in segmentation of merchants;
determining, by the one or more computing devices, a selected classification within a merchant database and initially selected by the merchant;
determining, by the one or more computing devices, that the selected classification is different from one or more segmentations identified for the merchant within the cluster;
reclassifying, by the one or more computing devices and based on determining that the selected classification is different from the one or more segmentations, the merchant to be within a new merchant classification in the merchant database; and
processing, by the one or more computing devices, a payment corresponding to a new merchant payment transaction conducted at the POS device of the merchant, wherein the payment is processed using the new merchant classification.

15. The system of claim 14, wherein at least one of:
the new merchant classification corresponds to a first fee rate charged to the merchant by a card network, wherein the first fee rate is lower than a second fee rate corresponding to the selected classification; or
the new merchant classification corresponds to a first level of risk associated with the merchant, wherein the first level of risk is lower than a second level of risk corresponding to the selected classification.

16. The system of claim 15, wherein the instructions further program the one or more processors to:
receive data corresponding to one or more reviews associated with the merchant, one or more websites associated with the merchant, and one or more job descriptions generated by the merchant,
and wherein the reclassifying the merchant is further based at least in part on the received data.

17. The system of claim 14, the acts further comprising:
analyzing the cluster for at least one of: merchant classification code (MCC) labeling, risk modeling, metric establishment, churn detection, seasonality detection, account takeover detection, customer or merchant targeting, or product placement.

18. The system of claim 14, wherein the transaction data for the historical payment transactions comprises transaction data obtained from the one or more merchants in real-time and aggregated by the payment service.

19. The system of claim 14, wherein training the statistical model further comprises:
applying a tokenization model to create an item vocabulary;
identifying one or more topics for the one or more merchants; and
obtaining a set of contextual features based at least in part on the one or more topics.

20. The system of claim 14, wherein reclassifying the merchant further comprises:
reclassifying the merchant within the new merchant classification for a plurality of segmentations of the one or more segmentations in the merchant database, based at least in part on determining that the selected classification is different from the one or more segmentations identified for the merchant.

\* \* \* \* \*